(12) United States Patent
Schultheis et al.

(10) Patent No.: US 8,382,346 B2
(45) Date of Patent: Feb. 26, 2013

(54) ILLUMINATION APPARATUS

(75) Inventors: Bernd Schultheis, Schwabenheim (DE); Petra Kuntze, Idstein (DE); Oliver Keiper, Aarbergen (DE); Sigurd Dressler, Obertiefenbach (DE); Andreas Hatzenbuehler, Siefersheim (DE); Walter Bleuel, Hofheim (DE); Klaus Engelmann, Bacherach (DE); Paul Bou Saleh, Wiesbaden (DE); Armin Plichta, Sponheim (DE)

(73) Assignee: Schott AG, Mainz (DE)

( * ) Notice: Subject to any disclaimer, the term of this patent is extended or adjusted under 35 U.S.C. 154(b) by 330 days.

(21) Appl. No.: 12/312,407

(22) PCT Filed: Nov. 9, 2007

(86) PCT No.: PCT/EP2007/009729
§ 371 (c)(1),
(2), (4) Date: Aug. 24, 2009

(87) PCT Pub. No.: WO2008/055694
PCT Pub. Date: May 15, 2008

(65) Prior Publication Data
US 2010/0002443 A1    Jan. 7, 2010

(30) Foreign Application Priority Data

Nov. 9, 2006   (EP) ..................................... 06023285
Dec. 7, 2006   (DE) .......................... 10 2006 058 079
May 22, 2007   (DE) .......................... 10 2007 024 014

(51) Int. Cl.
*F21V 21/28* (2006.01)
*F21D 8/00* (2006.01)

(52) U.S. Cl. ........ 362/419; 362/282; 362/554; 362/421; 362/581

(58) Field of Classification Search .................. 362/282, 362/528, 419, 421, 277, 371, 319, 322, 488, 362/490, 551, 558, 572, 573, 554, 581
See application file for complete search history.

(56) References Cited

U.S. PATENT DOCUMENTS 5,070,434 A * 12/1991 Suman et al. ................. 362/490
5,290,169 A    3/1994 Friedman et al.
(Continued)

FOREIGN PATENT DOCUMENTS

DE   100 02 106 A1   8/2000
EP   0 148 350       7/1985
(Continued)

OTHER PUBLICATIONS

International Search Report dated Mar. 6, 2008 from PCT/EP2007/009729.
(Continued)

*Primary Examiner* — Peggy A. Neils
(74) *Attorney, Agent, or Firm* — Ohlant, Greeley, Ruggiero & Perle, LLP.

(57) ABSTRACT

The invention provides an illumination device, preferably a reading lamp, which, on the one hand, has a compact design and, on the other hand, ensures a flexible illumination of objects, for which, in order to ensure an adequately high illuminance, high-power light sources can be used and which includes preferably a light source and a light-guiding element that can be pivoted and/or tilted around a pivoting/tilting point, which has at least one light-guiding axis and at least one light in-coupling surface as well as one light out-coupling surface, with the light-guiding element being arranged preferably in an axially displaceable manner in such a way that a free beam area can exist between the light source and the light in-coupling.

29 Claims, 13 Drawing Sheets

U.S. PATENT DOCUMENTS

| | | | |
|---|---|---|---|
| 5,404,297 A * | 4/1995 | Birk et al. | 362/421 |
| 5,613,752 A | 3/1997 | Vezard | 362/32 |
| 5,664,042 A * | 9/1997 | Kennedy | 385/136 |
| 6,089,741 A * | 7/2000 | Chen et al. | 362/583 |
| 6,179,453 B1 * | 1/2001 | McMahon | 362/490 |
| 6,302,571 B1 | 10/2001 | Davenport et al. | 362/580 |
| 6,540,390 B2 * | 4/2003 | Toth et al. | 362/552 |
| 7,011,439 B1 | 3/2006 | Kane et al. | 362/554 |
| 7,097,364 B2 * | 8/2006 | Wang | 385/76 |
| 7,163,329 B2 * | 1/2007 | Bina et al. | 362/576 |
| 7,210,930 B2 * | 5/2007 | Kovac et al. | 433/29 |
| 7,220,029 B2 * | 5/2007 | Bynum et al. | 362/490 |
| 7,249,873 B2 * | 7/2007 | Tiesler et al. | 362/488 |
| 7,261,438 B2 * | 8/2007 | Alessio | 362/268 |
| 2004/0043351 A1 | 3/2004 | Logan et al. | |

FOREIGN PATENT DOCUMENTS

| | | |
|---|---|---|
| EP | 0 483 477 A1 | 5/1992 |
| WO | WO 92/21915 | 12/1992 |
| WO | WO/0119280 | 3/2001 |

OTHER PUBLICATIONS

International Preliminary Report on Patentability from PCT/EP2007/009729; dated Jul. 16, 2009.

* cited by examiner

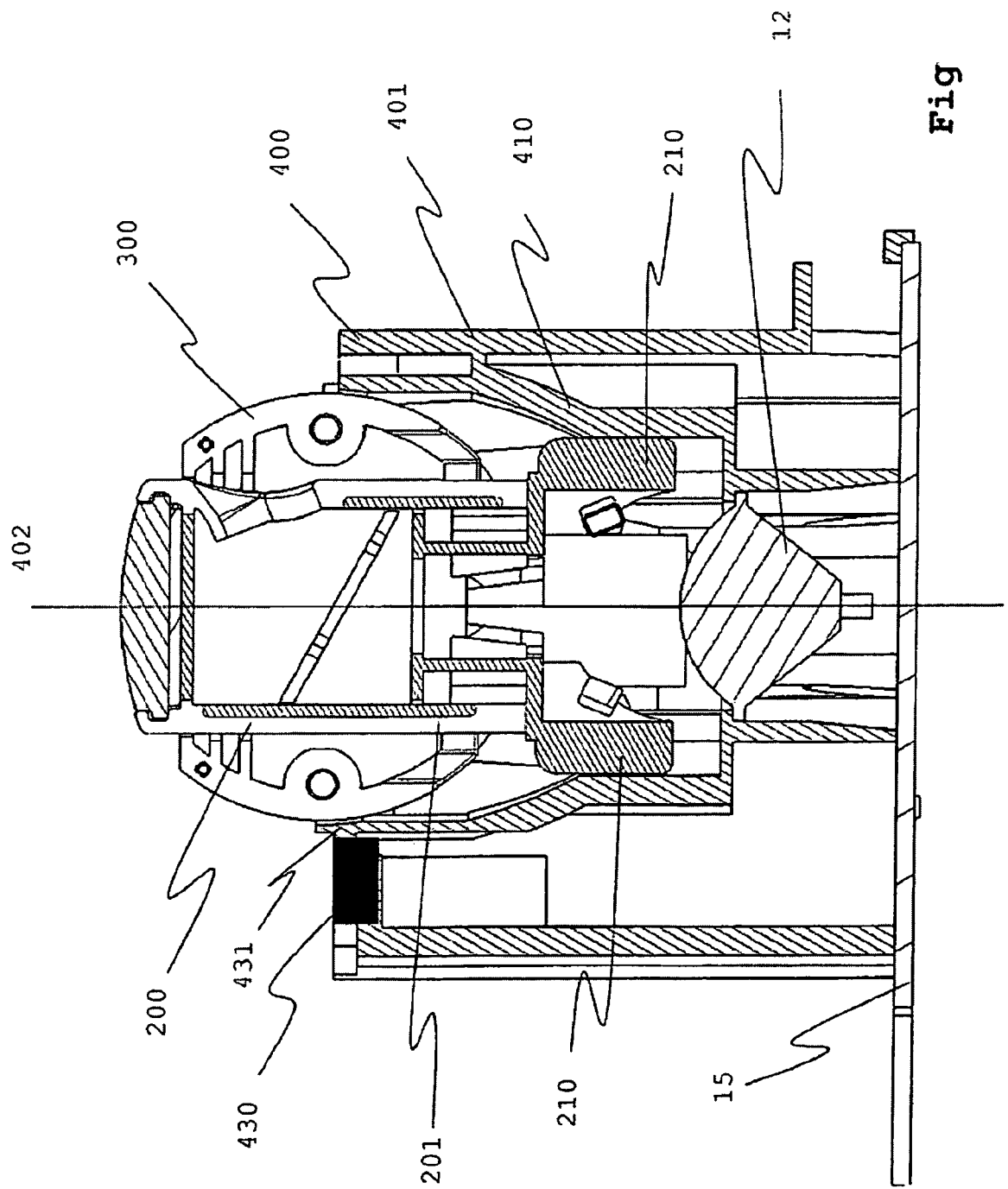
Fig 3.a

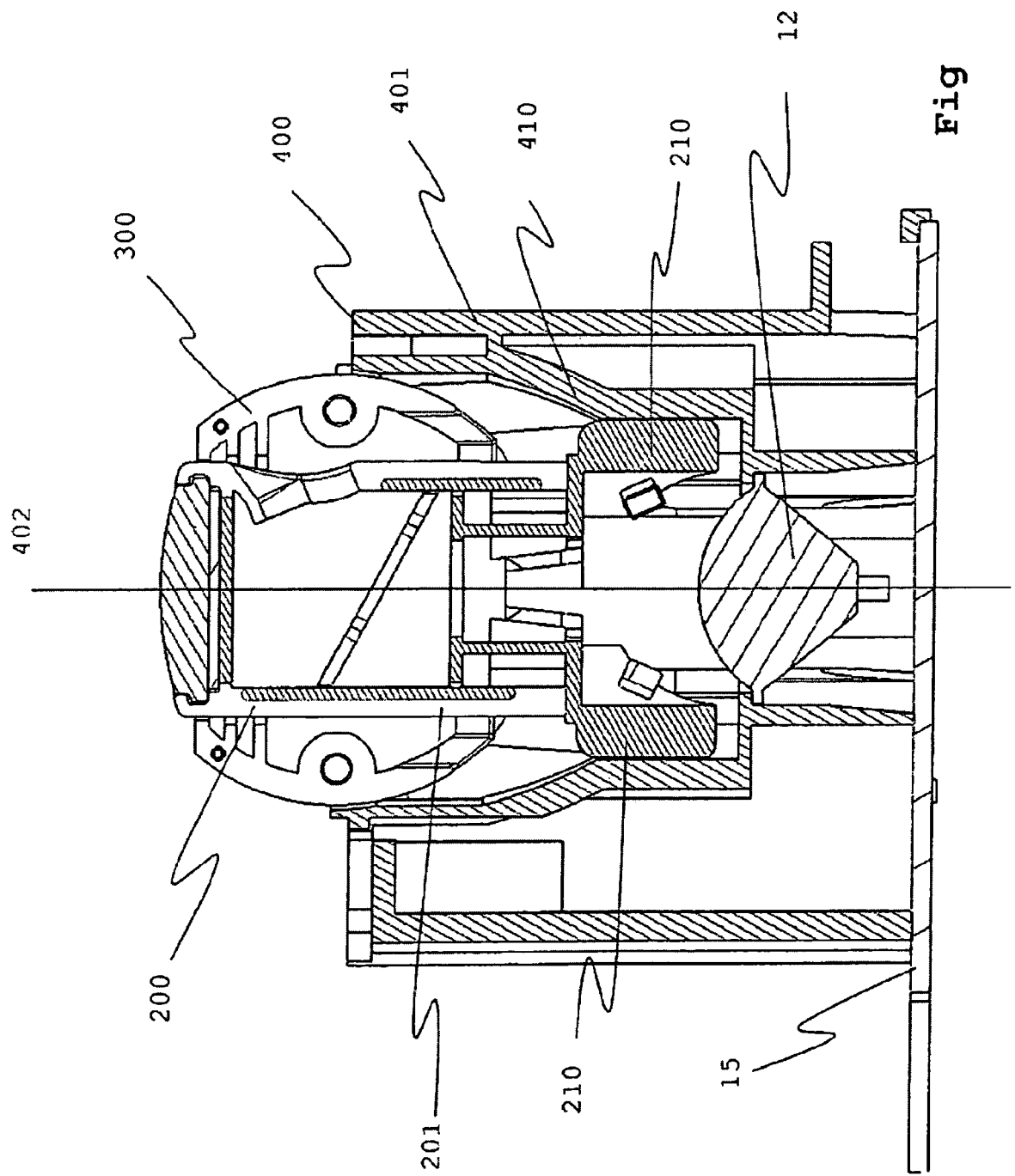
Fig 3.b

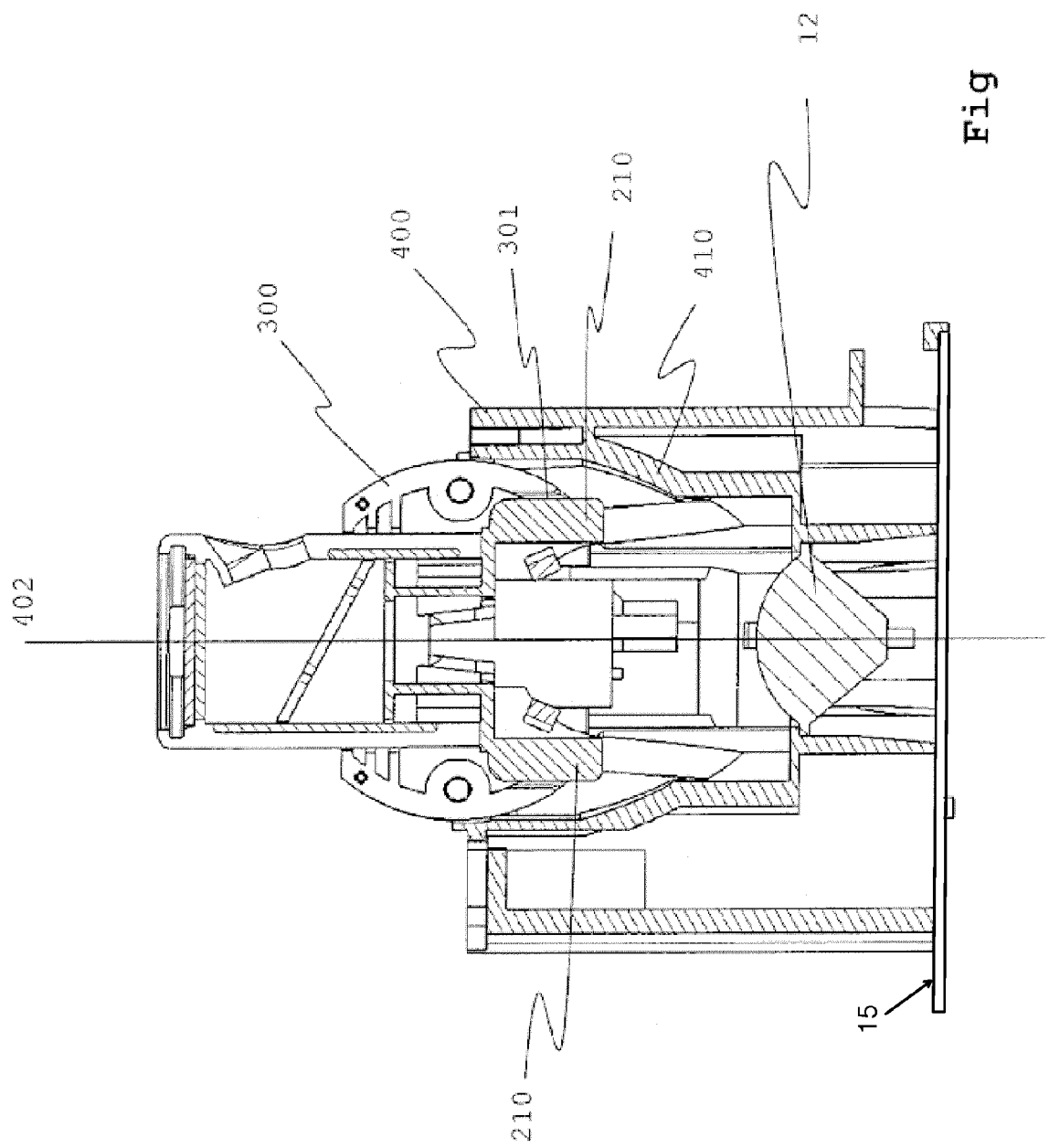
Fig 3.c

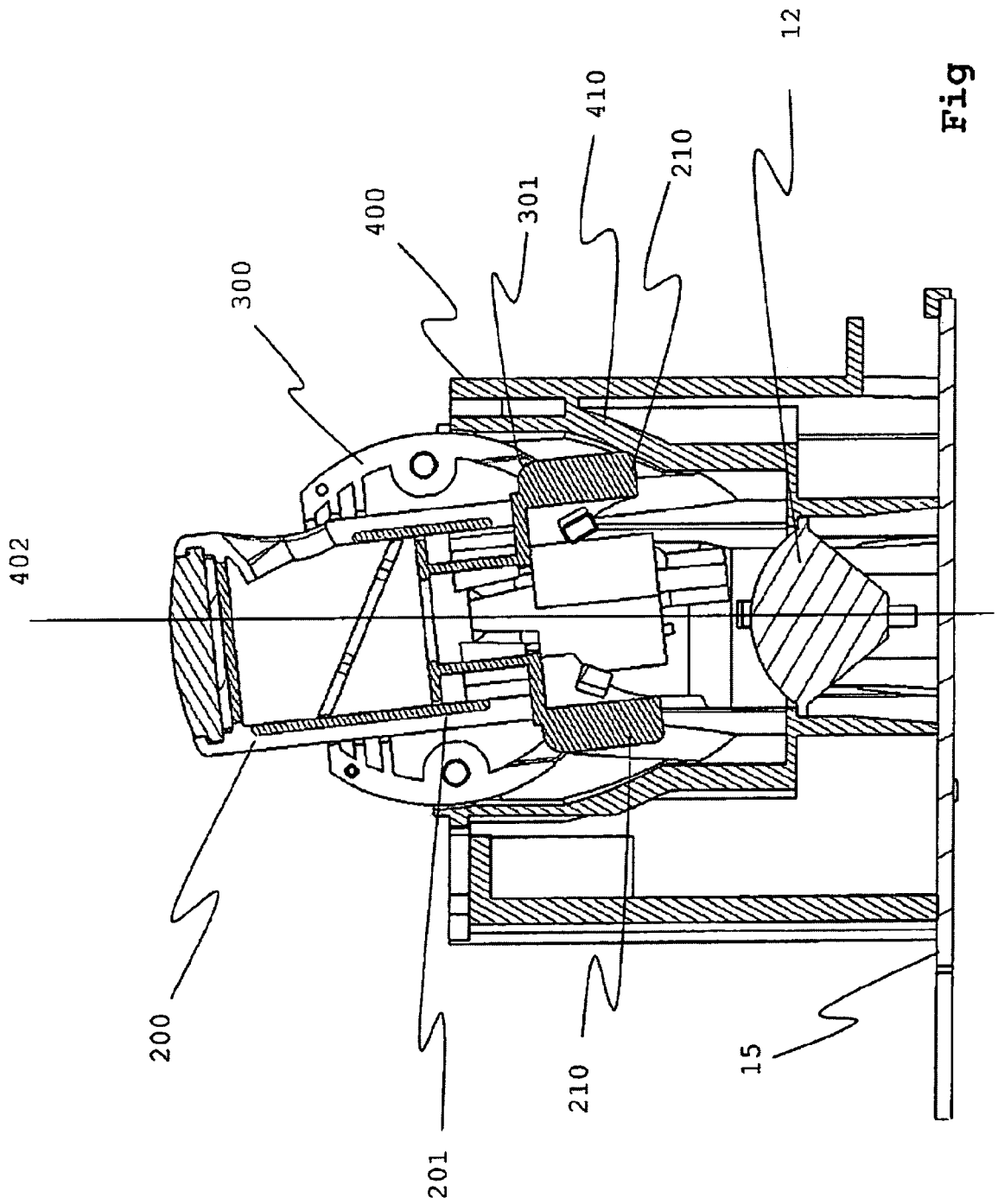
Fig 3.d

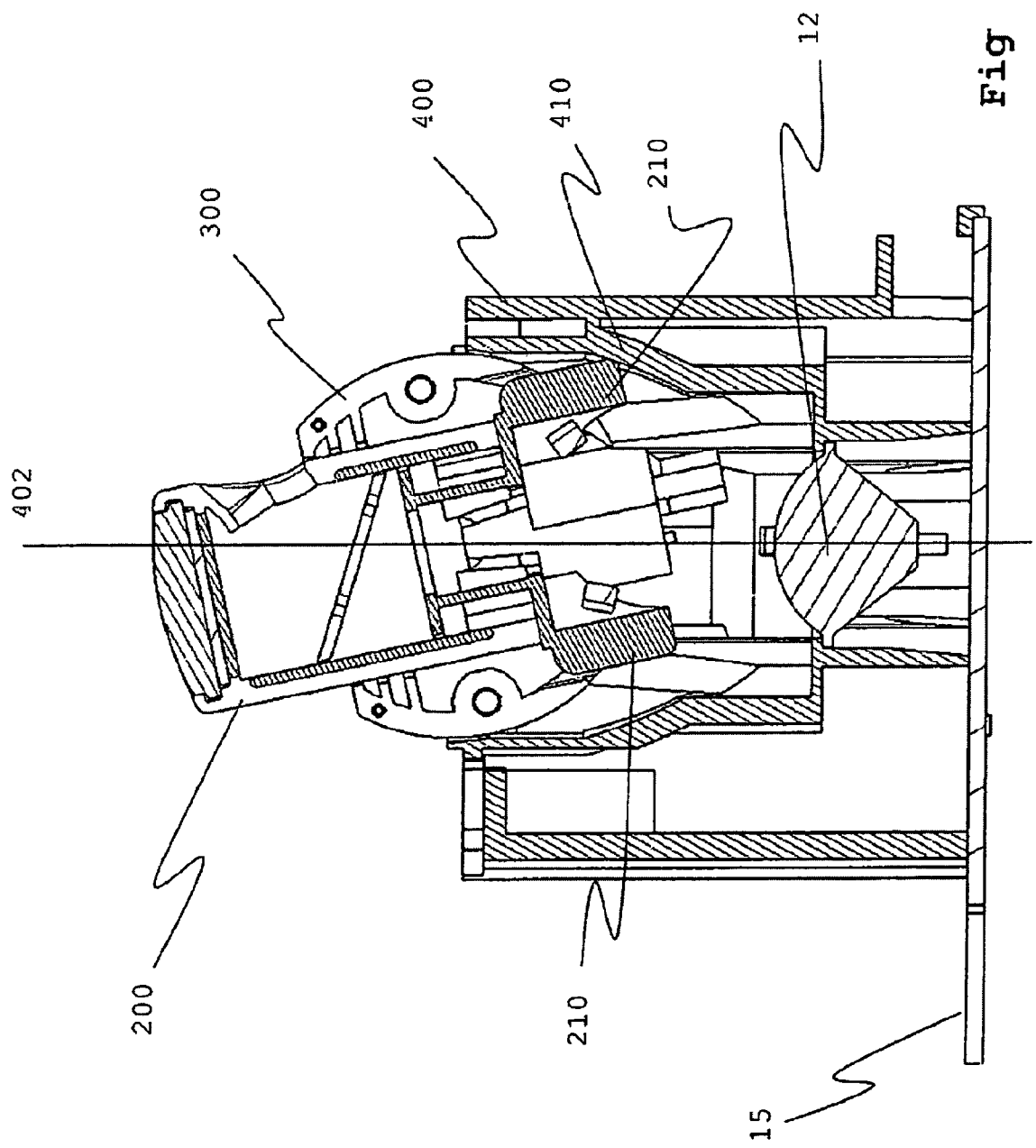
Fig 3.e

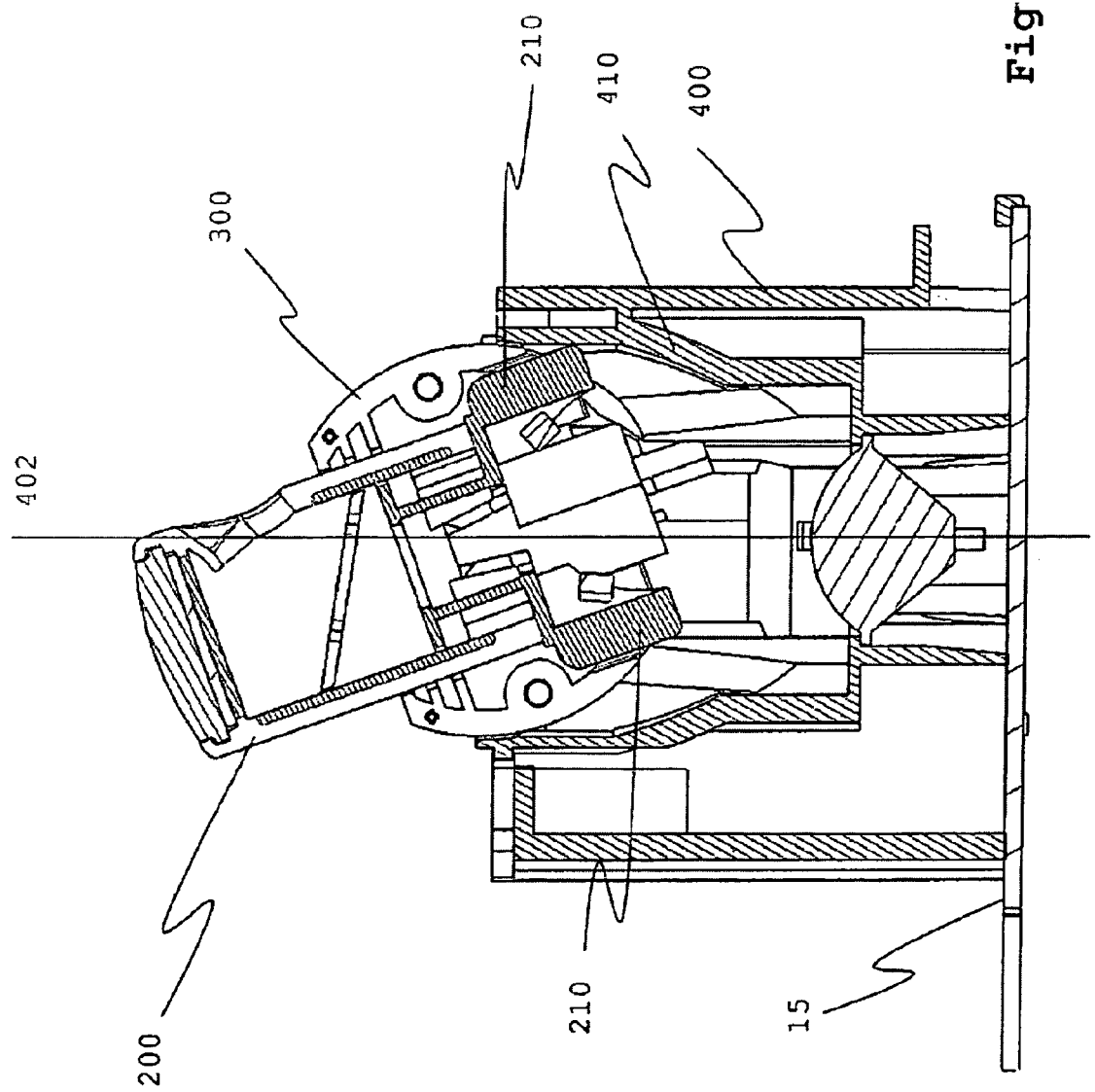
Fig 3.f

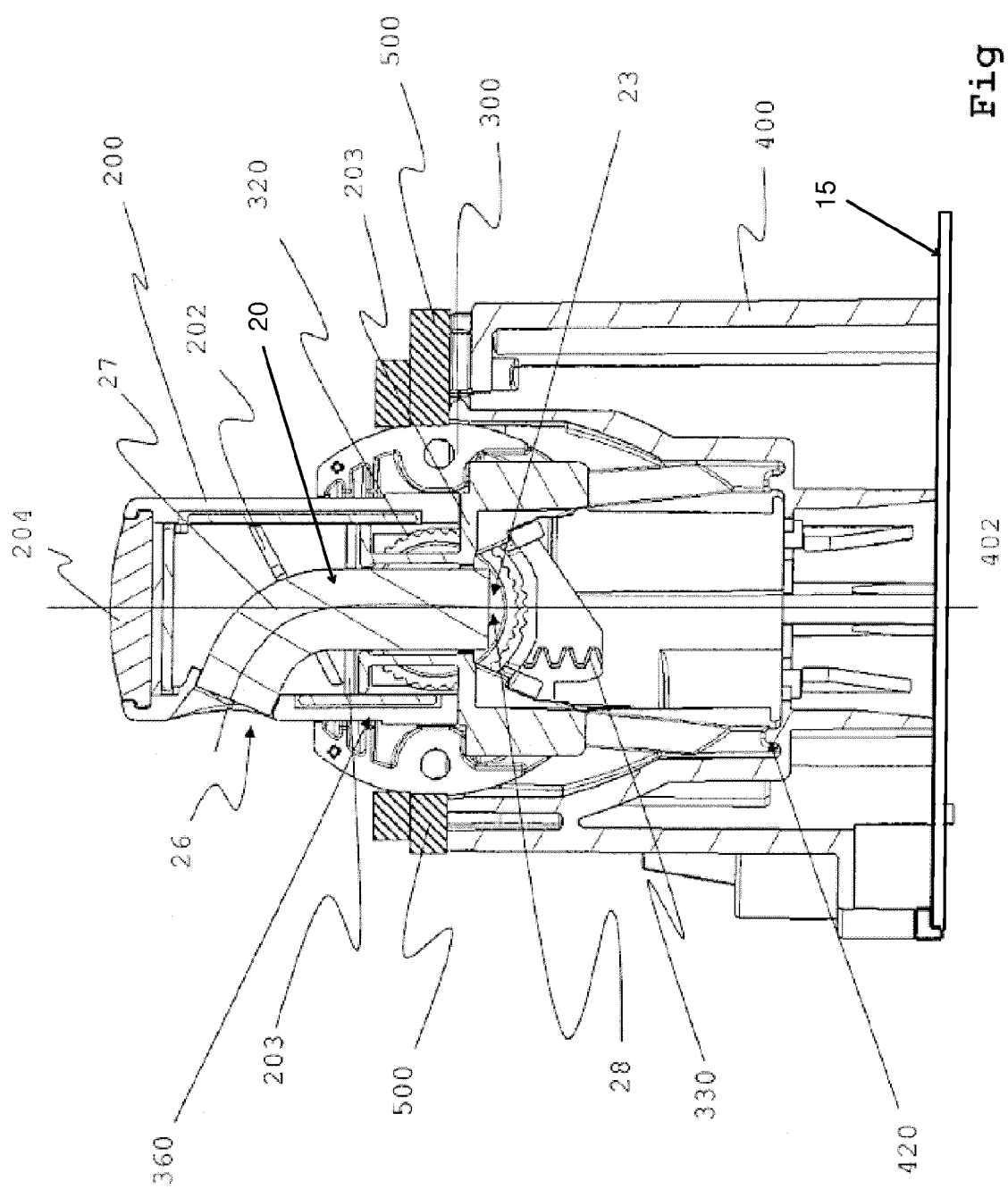
Fig 4.a

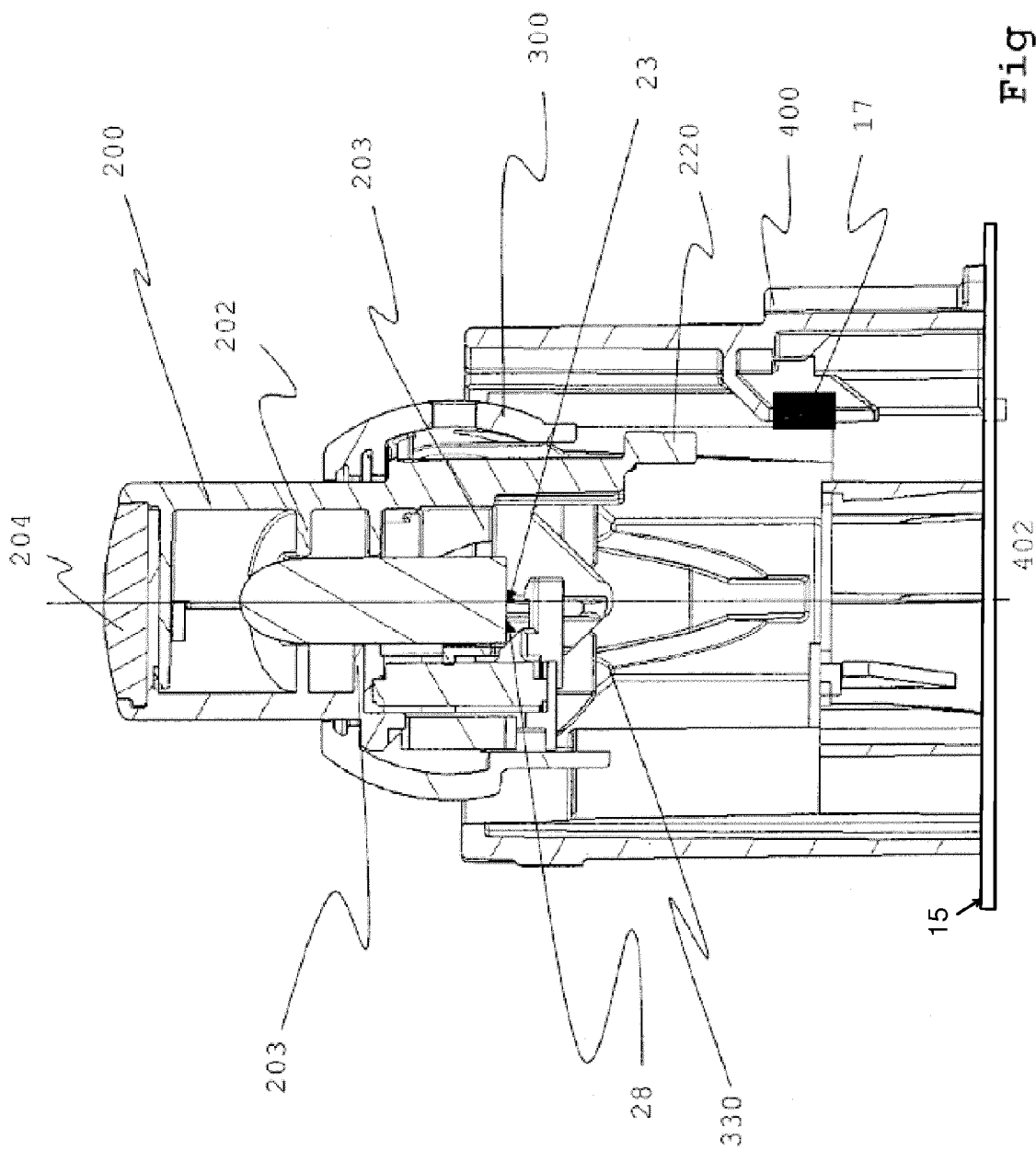
Fig 4.b

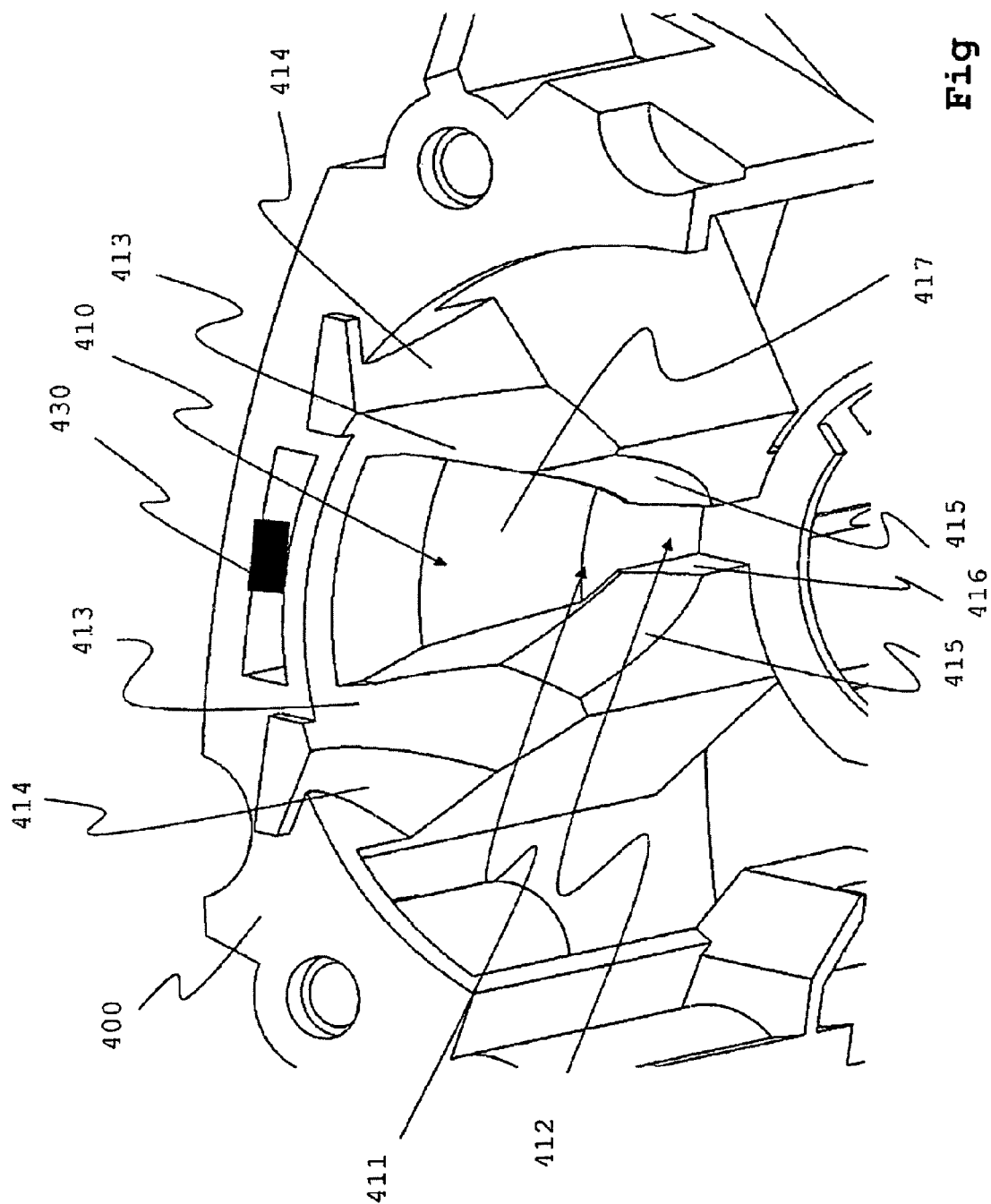

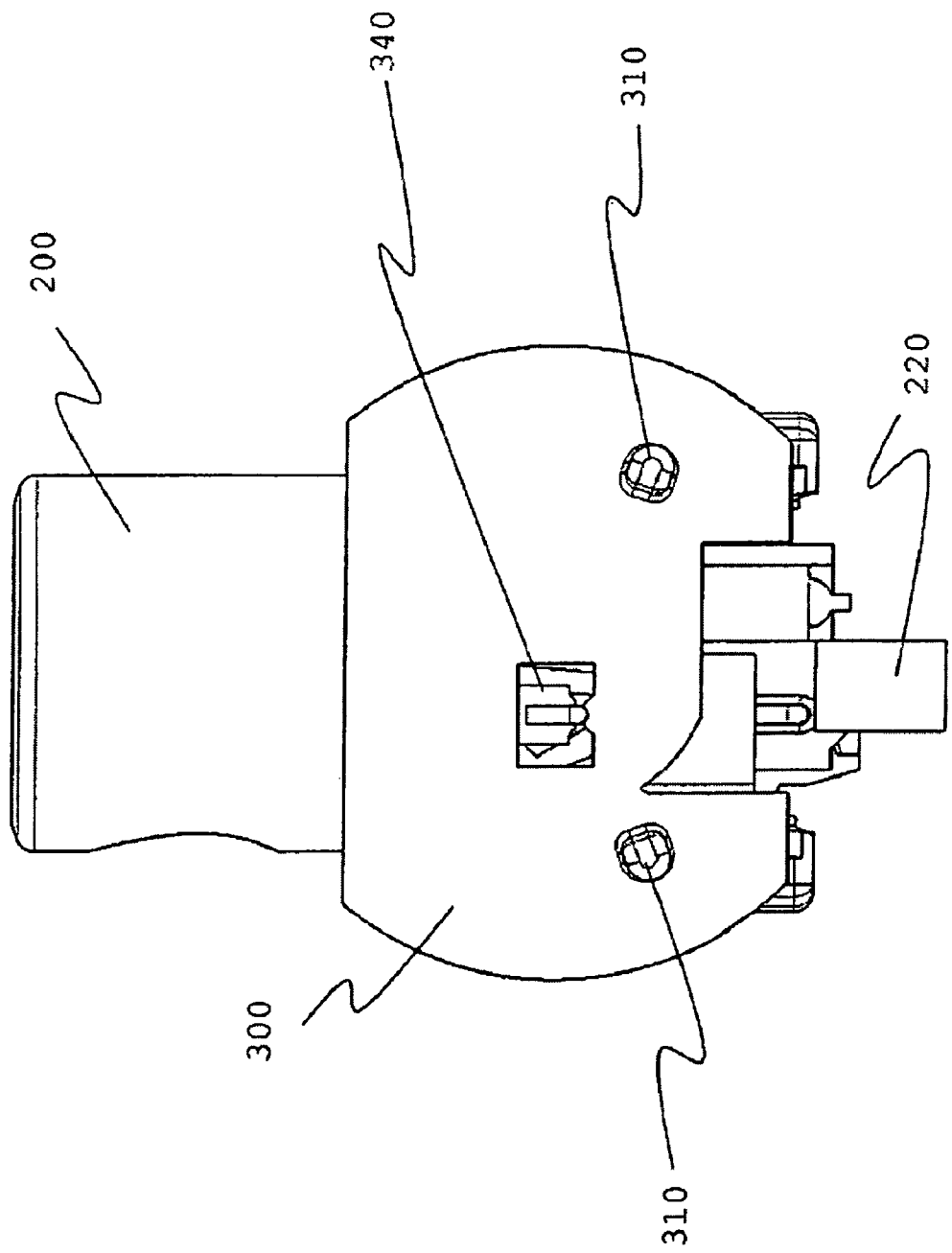
Fig 6.a

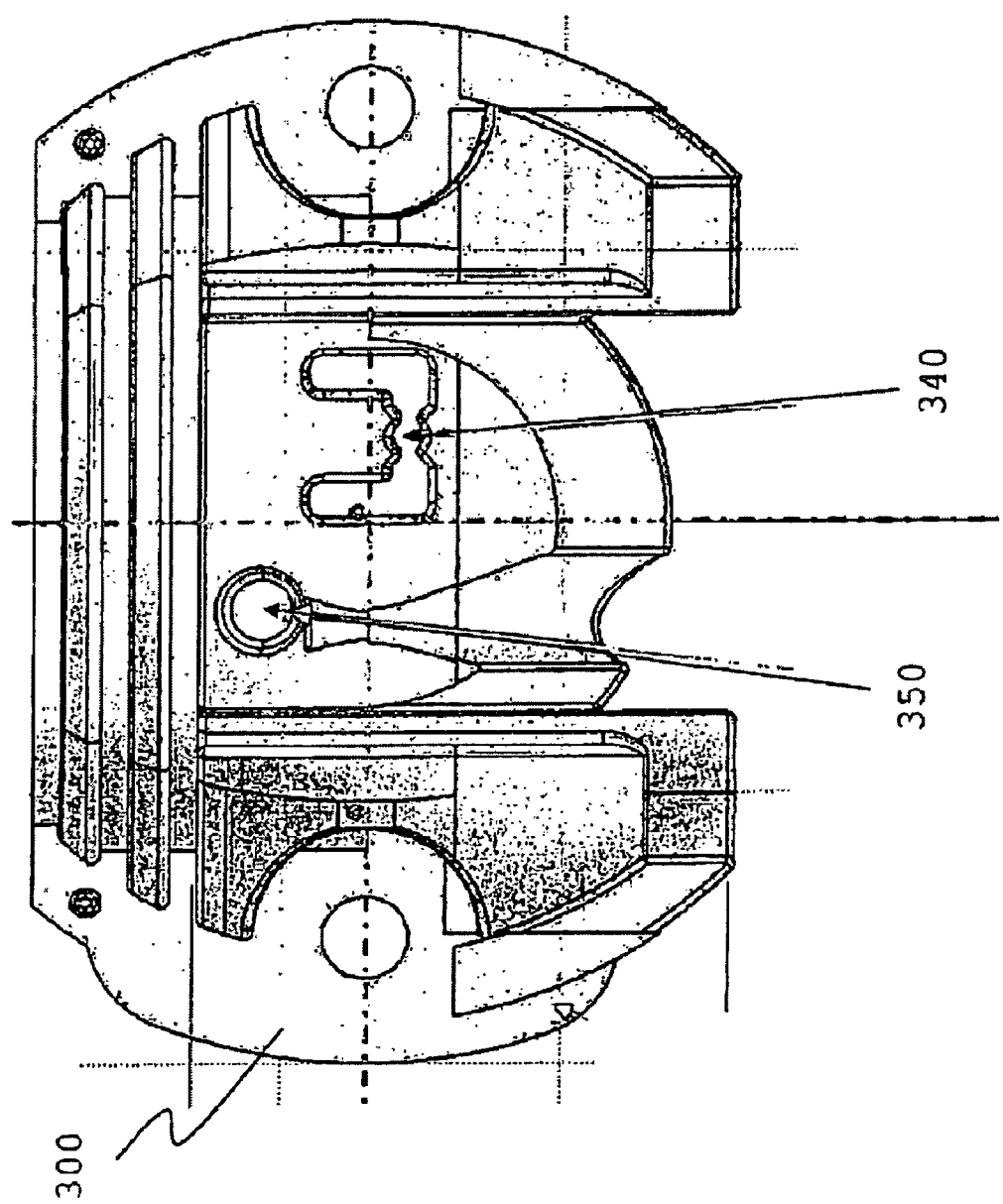
Fig 6.b

ILLUMINATION APPARATUS

BACKGROUND OF THE INVENTION

1. Field of the Invention

The invention relates to an illumination device, preferably a reading lamp, which has a light source with preferably at least one light-emitting diode as well as a light-guiding element for the illumination of an object.

2. Description of Related Art

Known from the field of dentistry are mobile light sources in which a light source, such as, for example, an LED illumination unit, is firmly joined with a flexible or rigid light guide. Light sources of this type are used, among other things, for hardening dental fillings.

WO 01/19280 A1 describes, by way of example, an irradiating instrument, which includes a light-emitting unit and a light-receiving unit with an input opening, with the light-emitting unit being composed of a plurality of light-emitting elements whose beams, emitting in a cone of light, irradiate the input openings directly.

US 2004/0043351 A1 describes a similar unit, in which a lens element is provided for better focusing.

Known from U.S. Pat. No. 5,290,169 is a similar element, in which, among other things, a rigid light guide is provided, which has a concave geometry as light input surface.

SUMMARY OF THE INVENTION

The problem of the invention is to provide an illumination device that, on the one hand, has a compact design and, on the other hand, ensures a flexible illumination of objects in defined boundaries. In order to ensure an adequately high illuminance, high-power light sources are to be used.

The problem of the invention is solved by an illumination device that includes the features mentioned in the introduction and/or the following features. These features include preferred embodiments as well. In the following, the symbol points to special advantages of the embodiment described.

BRIEF DESCRIPTION OF DRAWINGS

FIGS. 3.a to 3.f an embodiment of the reading lamp in various positions in a sectional illustration;

FIGS. 4.a to 4.b the embodiment illustrated in FIG. 3 with installed light-guiding element;

FIG. 5 the guide rail according to the invention;

FIGS. 6.a to 6.b an external and internal view of the ball for bearing the light-guiding element.

DETAILED DESCRIPTION OF PREFERRED EMBODIMENTS

Figure 1:
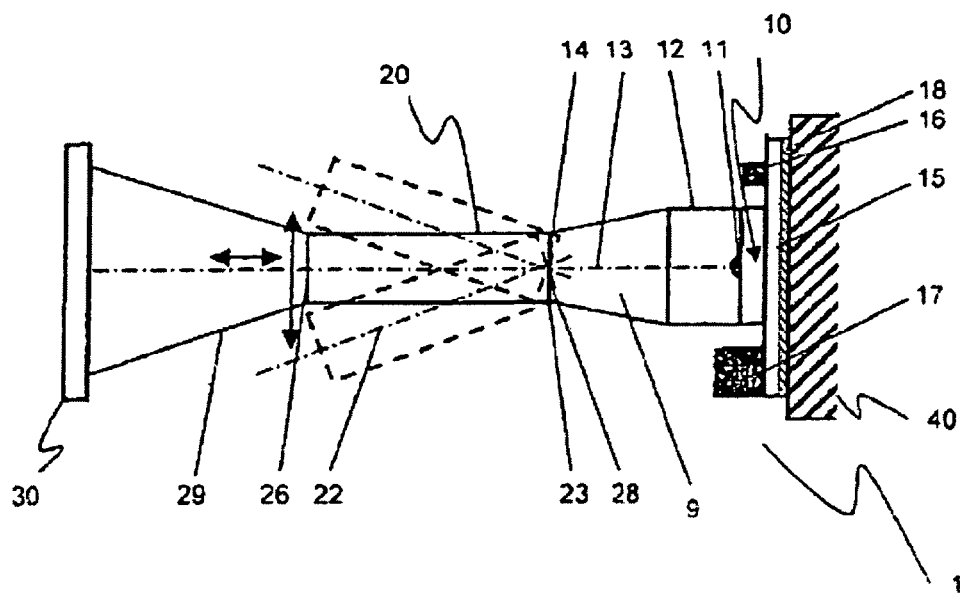
FIG. 1 the merely schematically illustrated plan view of one embodiment of an illumination device according to the invention.

In a preferred embodiment of the illumination device according to the invention, the light of a light source (10) is coupled in into a light in-coupling surface (23) of a light-guiding element (20), which has a light-guiding axis (22) and guided through a light out-coupling surface (26) onto a surface that is to be illuminated.

The light in-coupling surface defines the end of the light-guiding element by means of which the light enters into the light-guiding element. The light out-coupling surface defines the end of the light-guiding element via which the light emerges from the light-guiding element. If the light-guiding element is provided by fibers, for example, the light in-coupling surface and the light out-coupling surface are defined by the respective end of the fibers.

A free beam area can exist between the light source and the coupling-in surface in such a way that the light source can be arranged distant from the light in-coupling surface, if appropriate, so that an air gap is usually located between the two. A free beam area is also defined in such a way that the light in-coupling surface of the light-guiding element need not lie directly on the light source, but may be spaced apart from it. For example, the light can be directed via an optical component, such as, for example, a lens, onto the light in-coupling surface of the light-guiding element. In this case, the optical component would be an integral part of the free beam area.

The light-guiding element can be pivoted and/or tilted around a pivoting/tilting point (28), which is arranged in such a way that a user of the illumination device can direct the light to those places at which an illumination is desired. In this case, the term pivoting movement refers to a sideways pivoting, such as, for example, a movement to the left or to the right or vice versa, and the term tilting refers here to a tipping movement, that is, a movement from up to down or vice versa. These two degrees of freedom necessarily result in a third direction of adjustment, which may be referred to as a "rotation." Accordingly, the movement of the light-guiding element may be described also by a pivoting movement and a rotating movement. The diverting of the light coming from the light source by means of the light-guiding element makes possible an especially compact design of the illumination device. If the light source were to be used directly for illumination, means to cool the light source would also be necessary, in particular when high-power light sources are used in it or at it and these means would accordingly also have to be attached in the immediate proximity of the site of illumination. Particularly in the case of LED reading lamps known from airplanes, this would mean that the illumination head, in which the LEDs are integrated, would necessarily have to be correspondingly large. The use of a light-guiding element, however, permits the separation of the output site of the illuminating light from the light source itself, which can be arranged near to or directly at a preferably passive heat sink.

The pivoting/tilting point (28) that is associated with the light-guiding element may be arranged preferably at the point of intersection of the light-guiding axis (22) and the light in-coupling surface (23), which entails, in regard to the light in-coupling, high light-yield advantages and a low dependence of the light loss on the pivoting/tilting angle of the light-guiding element.

Preferably, the light-guiding element is mounted so as to rotate around its light-guiding axis. As a result, by tilting as well as by rotating the light, the user can direct it to the places at which he or she desires it, in particular when the light-guiding element emits at an angle to a main segment of the light-guiding axis. For this purpose, the light-guiding element can have two arms, one that is longer and one that is shorter, which are joined to each other, but are arranged so as to be tilted in relation to each other. The light that is conducted in the longer arm and accordingly in the main segment of the light-guiding element is guided, through the transfer into the shorter arm, which is arranged at a tilt, in the tilted direction of the shorter arm.

The pivoting/tilting angle is less than 40°, preferably less than 30°. The light-guiding element (20) is arranged so as to rotate around the light-guiding axis (22).

The light-guiding element (20) is preferably arranged so as to be axially displaceable in relation to the light source (10), with the light-guiding axis (22) of the one arm (21) of the light-guiding element (20) or of the light-guiding element (20) coinciding with the beam axis (13) of the light source (10). As a result, the illumination device (1) can be retracted and designed in an especially space-saving manner, which offers advantages in terms of safety for many applications. In the extended state, the free beam area is largest, whereas, in the retracted state, there is only a reduced, particularly minimal, distance. For example, there can also exist a contact between the light in-coupling area and the light source. In this latter case, the free beam area is no longer relevant, because, in this embodiment, the light is usually switched off. Besides these additional adjustment possibilities, the ability to displace axially the light-guiding element has the advantage that, in the retracted state, the illumination device can be designed in an especially compact and space-saving manner, even during use.

Particularly preferably, the light-guiding axis (22) of the light-guiding element (20) and that relative to the beam axis (13) of the light source (10) are oriented so as to be coaxial to each other. This enables the highest possible beam intensities to be achieved for the light that is passed through.

The light-guiding element (20) is made, particularly preferably, from a transparent plastic (e.g., PMMA or polycarbonate) or from glass, such as, for example, from a high-transparency borosilicate glass (e.g., DURAN®).

In a particularly preferred embodiment, the light-guiding element (20) is made up of several fibers, in particular fibers of a transparent plastic or glass fibers.

The light-guiding element (20) can be designed to be straight; that is, it has only a single light-guiding axis (22).

However, the light-guiding element (20) can also be formed from flexible optical fibers—for example, from one or more glass-fiber bundles or one or more bundles of plastic fibers.

Used particularly preferably are fiber rods made of glass having an $N_A$ of about 0.5. With this numeric aperture, acceptance angles of about 30° are possible; that is, the pivoting/tilting angle can be a maximum of about 30°, without the light yield dropping to an unacceptable extent.

The fiber rods consists, as is known, of a number of light-guiding fibers made from a core glass, each individual one of which is surrounded by a cladding made of glass, which, as a rule, has a small refractive index than does the core glass.

It is also possible to use fiber rods that are formed from a plurality of light-guiding fibers that are made from core glass and are not individually surrounded by a cladding, but rather for which the cladding surrounds the entire fiber rod. Mixed forms of these two described embodiments may also be preferably used.

Used in another particularly preferred embodiment in the illumination device according to the invention are fiber rods that have an $N_A$ of about 1. These are obtained by using particular kinds of glass in the glass rod and make possible acceptance angles of about 90°, which allow pivoting/tilting angles of up to nearly 90°.

Used particularly preferably are fiber rods having light-guiding fibers with cladding glasses surrounding the respective core, the fiber rod having, in addition, a cladding that surrounds the rod with its lateral surfaces. This outer cladding can be colorless, but, for certain applications, it can also be colored. When the colorless outer cladding is used, it can additionally increase the light yield, because it ensures that light that strays out of the light-guiding fibers can be conducted additionally to the site of illumination. This cladding conduction can contribute advantageously to an increase in the acceptance angle for light-guiding elements, preferably for light-guiding elements whose $N_A$ is not equal to 1.

If, instead of a colored rod, a light-guiding element consisting of one part, such as, for example, a solid glass rod, is used, the latter can contribute to the homogenization of the light profile originating from the light source, because, particularly also due to multiple reflections at the walls of the light-guiding element, a mixing of the light can take place.

In place of a straight light-guiding element, it is also possible to use preferably angled light-guiding elements. In this case, the light-guiding element (20) has at least one bent area (27) such that the light-guiding element (20) has one arm (21) with a light-guiding axis (22) and a light in-coupling surface (23), which is arranged at a right angle to the light-guiding axis (22), as well as another arm (24) with a light-guiding axis (25) and a light out-coupling surface (26), with the light-guiding axis (22) and the light-guiding axis (25) forming, in relation to each other, a bending or tilting angle that lies between 0° and 90°, preferably between 20° and 70°. As a result, a flexible illumination of, for example, filing tables or work surfaces is made possible and the cone of illumination (29) can be adapted individually to the respective needs.

Also possible are combinations of flexible and rigid elements as light-guiding element or light-guiding elements.

Owing to the tilting of the light-guiding element, reflections of the light emitted from the light source can result at the light input surface. The reflected light is lost for illumination and can thus lower the light yield of the illumination device. Therefore, the light input surface of the light-guiding element is preferably polished and/or subjected to anti-reflection treatment by means of, for example, an antireflection coating. In another preferred embodiment, the housing or housings in which the light-guiding element and the light source are mounted and/or at least a part of the housing between the light source and the light input surface of the light-guiding element are metalized. Particularly preferably, the housing of the illumination device is metalized in the free beam area. Alternatively or additionally, it is also possible to use a light material color for the corresponding part of the housing.

The light-guiding element (20) preferably has a light out-coupling surface (26), which forms an angle other than 90° with respect to the light-guiding axis (22) of the light-guiding element (20) or with respect to the light-guiding axis (25) of the one arm (24) of the light-guiding element, this making possible an angled beam direction of the cone of illumination.

Other angles of the light out-coupling surface are naturally also possible. All angles between 10° and 110° can be implemented advantageously when fiber-optic components are used. The diameter of the fiber-optic light-guiding element is particularly preferably between 5 and 8 mm. Larger diameters are also possible, depending on the application, provided that, for the corresponding intended application, fewer demands are placed on compactness. Obviously, for appropriate applications, smaller diameters can also be implemented. Used particularly preferably as a light source (10) is one or a plurality of white-light LEDs.

The light out-coupling surface (26) is preferably polished or slightly matted, with a matted surface being more advantageous for a more uniform illumination and a polished surface being more advantageous for spot illumination.

The light out-coupling surface (23) can be flat, convex, or concave in design, with a lesser angle dependence in regard to the light in-coupling existing, especially in the case of concave geometry, when the surface is polished or preferably has undergone an anti-reflection treatment.

In another preferred embodiment, the light element has side-emitting characteristics. This means that light can be out-coupled at its side walls. This can be achieved in that, among other things, the outer wall of the light-guiding element can be roughened and/or can be provided with scattering centers, so that light can be out-coupled at essentially a right angle to the light-guiding axis.

The light source (10) preferably has a focusing element (12), with which its light beams can be focused onto a focus surface (14). Preferably, the focus surface (14) lies in the light in-coupling surface (23) of the light-guiding element (20) or, in the case where the light in-coupling surface of the light-guiding element has a convex or concave shape, in a real or virtual focal point defined by the light in-coupling surface relative to the light-guiding axis. As a result, a very effective light in-coupling can be realized.

The printed circuit board (15) of the light source has, particularly preferably, driver electronics (16) for the light-emitting diode (11), which, for example, keeps the current constant; this ensures, at the same time, an overload protection of the light-emitting diode and a long-term uniform brightness for the compact design.

In addition, it is possible to provide additional electronics on the printed circuit board (15), by means of which the light source (10) can be dimmed continuously or in steps, enabling the power input to be reduced in the idle state, for example, and further allowing the illuminance to be adapted to the desires of the user.

The printed circuit board (15) preferably also has a switch (17)—for example, in the form of a microswitch—by means of which the light source (10) can be switched on or off and/or can be dimmed in one or more steps. The printed circuit board is connected to the switch via a lead, via a daughterboard, or via a receiving socket.

It is possible to arrange at the light element or mold onto the frame of the light element (20) a control surface for mechanical control of a switch. Alternatively, it is possible to fix in place a permanent magnet that serves for control of a contactless switch (17).

The switch (1) that is affixed on the printed circuit board can be controlled in a mechanical or contact-free manner. The contact-free control of the switch (17) may be understood to refer to an optical, inductive, or capacitive control of the switch.

The switch (17) is preferably switched when the light-guiding element is axially displaced, in particular after conclusion of the pivoting/tilting movement of the light-guiding element (20) and/or, in the case of the rotational movement around the light-guiding axis of the light-guiding element (20), when it is reset.

A reflection element can be arranged at the light element (20) or on the frame of the light element. The reflection element can be designed as a mirror or as a foil. The application of a contrast color would represent an alternative to this.

A color change can also be effected in connection with three-colored RGB LEDs.

When white-light LEDs are use, it is known that, owing to their manufacture, the LEDs also have a color temperature that differs more or less strongly from one to the other. Therefore, either electronic switches are used to attain a specific color temperature or LEDs are selected from a so-called bin and then have a quite similar color temperature. An adaptation to the color temperature of the LEDs is possible by way of the appropriate choice of materials (e.g., glasses) of the light-guiding element that have appropriate spectral transmission profiles. In this case, the glass acts specifically as a color filter. If, for example, a glass rod having characteristics that homogenize the beam profile is used as a light-guiding element that, in transmission, brings about a warm hue of the light that passes through it, a cluster of white-light LEDs can be used as a light source that instead usually has a color temperature that is too cold and, at the site of illumination, a neutral color temperature will still be achieved.

The heat sink (40) can be a part of a housing fastening for the illumination device (1). If the illumination device is integrated into a receptacle, for example, then a frame of the receptacle, which is usually present in any case and is capable of dissipating heat, can serve as a passive heat sink and thus obviate an active cooling of the light sources or passive cooling bodies that are large in size, with the term passive cooling being understood to mean a cooling that does not necessitate any ventilators or Peltier elements or other power-consuming elements. This contributes to the compactness and to the low noise of the illumination device.

The light-guiding element (20) of the illumination device (1) preferably has, in the switched-off state of the light source (10), an idle position and, in the switched-on state, a working position, which is displaced along the beam axis (13) of the light source (10), this advantageously making possible the integration into a push-push housing.

The ratio of the surface area of the light in-coupling surface (23) to the surface area of the light out-coupling surface (26) of the light-guiding element (20) can be different from 1, this enabling an adaption of the numeric aperture of the light-guiding element (20) to the radiation characteristic of the light source (10).

The light out-coupling surface (26) can have any desired contour, with the light in-coupling surface (23) being designed preferably to be circular in shape.

In one embodiment, the illumination device according to the invention includes a displaceable carriage to hold and to guide the light-guiding element preferably axially. The carriage can also be referred to as a push element. The light-guiding element is fixed in place on the carriage. In particular, the light-guiding element is arranged, at least in segments, within the carriage. In detail, the light-guiding element can be tipped, in particular bent or angled, in relation to the housing axis within the carriage, so that the light can emerge through the light out-coupling surface from the side.

The carriage has, at least in segments, the form of a pin, at the bottom end of which at least one fin is arranged or preferably two fins is or are arranged for guiding the carriage. The guiding is effected in a ball and/or in a housing, which will be described further below. The term fin refers to a "dorsal-fin-like" or "keel-like" appendage for guiding and/or stabilizing the carriage, in particular in the housing and/or the ball.

In one embodiment, the illumination device has, in addition, a housing for receiving the ball, which will be described further below, and/or for receiving the carriage. The light-guiding axis of the light-guiding element is, at least in segments, arranged parallel to the housing axis. The housing is preferably constructed in one piece. In particular, it has an essentially triangular cross section.

Furthermore, in another embodiment, the illumination device can include a ball for bearing the carriage. A ball is a body for receiving, for guiding, and/or for bearing the light-guiding element and/or the carriage. The ball may also be referred to as ball element or bearing element. In one embodiment, the ball has, at least in segments, a spherical shape. Preferably the ball is designed as a ball without the respective ball caps. The light guide and/or the carriage are or is arranged so as to move axially in the ball and/or so as to move in the housing. In this case, the light guide and/or the carriage extend or extends through the ball.

The ball is mounted on and/or in the housing so as to move in a sliding manner. In one embodiment, the ball is mounted on ribs, preferably four, which are arranged, at least in segments, in the interior of the housing. In particular, the ribs are symmetrical, preferably spherically symmetrical, in relation to an axis that is arranged at a right angle to the longitudinal axis of the housing.

On its outer side, the ball has at least one projection, which can come to rest against the aforementioned ribs. Accordingly, a rotational movement of the ball in relation to the housing can be limited.

The ball can be rotated, particularly in the extended position of the light-guiding element and/or of the carriage, by an angle of up to +/−20°. The extended position describes preferably the position of use, that is, the position in which the illumination is activated. The lowered position describes, by contrast, preferably the position of non-use, in which the illumination is not activated or the illumination is not to be used for illuminating, for example a newspaper.

On its bottom side, the ball has at least one recess, into which, particularly in the extended position of the carriage, a fin can engage, so that, simultaneously, the preferably axial movement of the carriage is carried out and a rotational movement is at least reduced.

In addition, the illumination device is characterized in that it includes a spring element, which is arranged in the upper area of the housing for positioning of the ball on the housing.

In addition, the ball has a recess in its outer side, in which a catch element, which is designed as a hook, in particular, can be movably affixed. The catch element engages in a groove, which defines a preferably two-dimensional control cam and which is preferably arranged on an outer side of the carriage. In this case, the catch element slides in the groove. The catch element can be locked in place in at least two positions in the control cam, which define, in particular, a lowerable position and an extended position of the light-guiding element.

In one embodiment, the control cam is essentially designed as a heart cam, which is extended downwards and/or upwards by at least one, preferably essentially linear extended branch. The term heart cam refers to a control cam that is essentially heart-shaped. The tip of the heart cam points in the direction of the light in-coupling surface and accordingly toward the bottom side of the housing. The tip of the heart cam defines the extended position of the light-guiding element. The cams that run inward toward each other serve, at their point of contact, as a catch depression for the carriage, which is joined via the catch element, in its lowered position. The point of contact of the heart cam thus defines the lowered position of the light-guiding element.

In this case, the aforementioned cams can be arch-shaped or angular. In one embodiment, the heart is constructed, at least in segments or else in its entirety, from linear segments, so that the heart, at least in segments or in its entirety, is formed by corners. In this case, the heart is designed, at least in segments, in a polygonal shape. Preferably, in this case, the heart has 5 or 6 corners. In order to allow the catch element to run around in the control cam in the orientation corresponding to the lowering or extension of the light-guiding element, the heart is not designed with mirror symmetry, but rather has, in particular, a two-dimensional forced control cam.

The light-guiding element and/or the carriage can be moved or displaced, in particular axially, against the pressure of a spring, such as, for example, a tension spring. In one embodiment, the spring is fastened at a top end to the ball and at a bottom end to the light-guiding element and/or to the carriage, so that the ball and the light-guiding element and/or the carriage are pretensioned against each other. The top end of the spring is fastened, preferably in a releasable manner, at a first projection, which is located in the inner side of the ball, and the bottom end of the spring is fastened to a second projection, which is located on the outer side of the carriage. The carriage has a kind of channel, a recess, or a notch, in which the spring is positioned and securely guided, in its outer side for guiding the spring.

Preferably, the control cam and the spring are arranged on the same side of the carriage. The control cam and the spring are arranged at a mean separation of less than 10 mm, preferably of less than 5 mm, from each other. This adjacent arrangement enables a markedly reduced, in particular minimal, tensioning of the component element to be achieved.

The spring and the combination of catch element and control cam interact in such a way that the light-guiding element and/or the carriage can be locked in place in a lowered position and in an extended position and, in an extended position, are or is limited against a mechanical stop.

The function of the fin is or includes bringing about the individually adjusted position of the illumination during the push-in movement when the carriage is extended, in particular for switching off, the resetting of the mechanism, in particular the ball position, in the nominal position.

The function of the spatial resetting is appropriate control at will in operation and consists in a resetting movement with respect to the Z axis by way of at least one lateral guide rail. The Z axis is defined, in particular, by the housing axis.

The resetting of the pivoting movements of the X and Y axis takes place by way of a kind of funnel-shaped guide surface in first approximation. The X and Y axes lie, in particular, at a right angle to the Z axis.

For this purpose, the movement of the fins is controlled by at least one guide surface arranged in the interior of the housing. Accordingly, the movement of the carriage and, as a result, of the light-guiding element is also controlled. The lateral guide surface for the fin is provided by guide rails arranged on the inner side of the housing. The guide rail is formed by two guide ribs or two raised portions, such as ridges, and/or by a recess.

The guide ribs have curved surfaces for defined insertion of the fins into the guide rails, at least in the upper area, that is, in the area facing away from the light in-coupling surface. The guide rail is preferably formed by the ribs that, in their upper area, provide the bearing surface for the balls.

The guide rail is broadened in its upper area and narrowed in its lower area. The broadening makes possible, on the one hand, a simplified threading or insertion of the fins into the guide rail. On the other hand, this broadening makes it possible to rotate the light-guiding element. The guide rail is formed, in particular, by at least two segments, with the first, upper segment being broadened and the second, lower segment being a preferably congruous groove. The shape of the guide rail may also be referred to as funnel-shaped in this case. In the extended position of the light-guiding element, the fin can be rotated around the housing axis in a range of up to about +/−15°. In its extended position, the fin engages with the recess arranged in the bottom side of the ball. Accordingly, the ball rotates together with a rotation of the carriage.

When the light-guiding element is transformed from its extended position to its lowered position, the fin is controlled by the guide rail in such a way that the carriage is brought from the released position through the narrowing into a locked position. On the one hand, the light-guiding element, preferably the carriage, the ball, and/or the housing interact in such a way that, in the lowered position, the light-guiding element and/or the carriage are or is situated in essentially a locked and/or rotationally blocked position. The light-guiding element and/or the carriage essentially cannot be rotated in the lowered or retracted position. Resulting from this is the advantage that, in this position, a mechanical switch, for example, can be controlled in a defined manner and switching tolerances can be minimized.

On the other hand, the light-guiding element, preferably the carriage, the ball, and/or the housing also interact in such a way that, in the extended position, the light-guiding element and/or the carriage are or is situated in the released position. A released position refers to a position in which the light-guiding element and/or the carriage can move, without certain limits, in three dimensions, in particular in the pivoting and rotating movement. Accordingly, in the switched-on state of the illuminating means, the light emerging from the light out-coupling surface can radiate in different directions. This is achieved by a rotation of the light-guiding element and/or the carriage and by a tilting or pivoting of the light-guiding element and/or the carriage. The arrangement in the ball thus results in rotation of the ball as well.

The light-guiding element and/or the carriage can be rotated, in the extended position, by a defined angle, preferably of up to +/−15°, around its own axis and/or the housing axis. In addition, the light-guiding element and/or the carriage can be pivoted or tilted around the previously described pivoting/tilting point in the extended position. In this case, the light-guiding element and/or the carriage can be tilted, preferably by an angle of up to +/−20°, in total 40°, in relation to the housing axis, and can accordingly be pivoted in three dimensions. In one embodiment, the top side of the light-guiding element and/or of the carriage defines, at least in segments, a ball surface, in particular a ball cap, during a movement of the light-guiding element and/or of the carriage in the extended state.

As already discussed above, the illumination device has, in one embodiment, additionally a damping device for guiding and/or damping the movement of the light-guiding element and/or of the carriage. The damping device is arranged on the side of the carriage lying opposite to the catch element. The damping device is preferably arranged between the ball and the light-guiding element and/or carriage. The damping element acts when the light-guiding element and/or the carriage is extended, retracted, or retracted and extended.

The damping device interacts with the ball in such a way that a preferably axial movement of the light-guiding element and/or of the carriage is damped. In this case, the damping device is arranged, preferably fixed in place, on the light-guiding element and/or on the carriage. For this purpose, the damping device is positioned in a recess or opening that is introduced at an outer side of the carriage. The recess has a guide that, at least in segments, has a raised portion and that interacts with a recess, which is introduced in the inner side of the ball, in such a way that a rotational movement of the carriage in the ball is reduced or suppressed.

This damping device is preferably a rotation damper. Preferably, the damping device is designed as a toothed wheel. In this case, the damping of the movement is caused, in particular, by the viscosity of the fluid in which the damping device moves, at least in segments.

In one embodiment, the damping device consists at least of one housing part with special outer toothing and a toothed wheel that is attached to the damped rotor shaft.

In this case, the toothed wheel of the damping element intermeshes, preferably at all times, in the patterned structure in, for example, the formation of a toothed rack, which is arranged at or molded onto the inner side of the ball.

The housing interacts with a patterned structure, preferably formed as grooves, which are arranged in the inner side of the carriage, so that the movement of the light-guiding element and/or of the carriage is damped. At least one of the following variants is possible:
a) When the damping element is not installed, the illumination functions without damping.
b) When the damping housing cannot be rotated, the damping element acts during retraction and extension.
c) When the damping housing is blocking during extension, the damping element acts only during extension.
d) When the damping housing is blocked during retraction, the damping element acts only during retraction.

Accordingly, it can be provided that the damping element acts only during extension, only during retraction, or both during retraction and extension of the light-guiding element and/or of the carriage.

As already discussed, the illumination device has at least one optical component, preferably a lens, for guiding, diverting, and/or focusing the light of the light source onto the light in-coupling surface. The component is arranged both on the light-guiding axis and on the housing axis. The component is arranged in the interior of the housing. The housing is furnished with fastening means, to which the component is fastened, preferably in an exchangeable manner. Preferably, the holder, in particular the lens holder, is integrated in the housing. The component is positioned below the guide rail.

The switch or the switching element, which has already been described above, is arranged in a receiving pocket that is fixed in place in the interior of the housing. The switching element interacts with at least one actuator of the carriage, which is designed, for example, in the form of a projection and is arranged on the bottom side of the carriage, so that a switching operation can be triggered in order to activate or deactivate the illuminating means. The light element or the light source is preferably switched on in the extended position of the light-guiding element. In the lowered position of the light-guiding element, by contrast, it is preferably switched off. The mentioned actuator can slide along an outer side of the receiving pocket, preferably without contact, and accordingly trigger a switching operation. Furthermore, the projection interacts with the outer side of the receiving pocket in such a way that the projection comes to rest against the receiving pocket, in particular in the lowered position of the light-guiding element and or of the carriage, and a rotational movement can be further limited. The actuator for triggering the switching operation is preferably arranged below the heart cam. In particular, the one side length of the carriage is lengthened in comparison with the other side.

The light-guiding element and/or the carriage are or is movable in all three spatial directions in the extended position. The total freedom of movement of the light-guiding element and/or of the carriage in the extended position is returned into the central position during lowering or insertion into the housing and is, in particular, essentially suppressed. Accordingly, the light-guiding element and/or the carriage can be lowered in the housing and/or the ball. In addition, during insertion into the lowered position, the light-guiding element and/or the carriage is oriented in a position in which the axis of the carriage lies on the housing axis. The light-guiding element and/or the carriage pivot or pivots during retraction or lowering into the position mentioned.

Furthermore, the present invention includes an illumination device with a destruction protection for a catch mechanism. This includes, in particular, the previously discussed features of the invention. The illumination device includes a bearing element that preferably can rotate and in which a carriage that carries an illumination element, preferably a light-guiding element, is arranged so as to be, in particular, axially displaceable, with, via displacement of a catch element in a control cam, at least one locking position, in particular a catch position, of the carriage is produced in the bearing element, so that, in at least one direction of movement of the carriage in the bearing element, the movement of the carriage is limited by at least one stop in such a way that the catch element can move maximally up to the position at which the catch element rests against an outer wall of the control cam, but not beyond it. In this case, the illumination element can be arranged in the carriage, for example.

In addition, the following lies in the framework of the present invention: A destruction protection for a catch mechanism for a device, in particular an illumination device, consisting of a carriage and a preferably rotatable bearing element, in which the carriage, which, in particular, carries an illumination element, preferably a light-guiding element, is arranged so as to be axially displaceable, with, via the displacement of a catch element in a control cam, at least one locking position, in particular a catch position, of the carriage being produced in the bearing element, so that, in at least one direction of movement of the carriage in the bearing element, the movement of the carriage is limited by at least one stop in such a way that the catch element can move maximally up to the position at which the catch element rests against an outer wall of the control cam, but not beyond it.

In one embodiment, the illumination device or the destruction protection is characterized in that the movement is limited in such a way that it ends before the position at which the catch element rests against the wall of the control cam.

In another embodiment, the illumination device or the destruction protection is characterized in that the control cam has at least one extension, which is designed in such a way that the catch element does not come to rest against the outer wall of the control cam during a movement up to the stop.

The destruction protection can, furthermore, include the features discussed in the preceding description.

The following uses are advantageously possible, among others, by means of the illumination device:

Use of the illumination device (1) as a seat illumination, as a reading light for airplane seats, for seats in rail vehicles and/or in motor vehicles, particularly in passenger cars or travel buses, with the compact design and high functionality being especially attractive.

Use of the illumination device (1) as a work light, which can be integrated into ceilings or walls.

Use of the illumination device (1) in furniture, particularly in kitchen furniture.

Use of the illumination device (1) for object illumination in showcases.

Use of the illumination device (1) as aperture-free, if appropriate retractable, instrument illumination in passenger cars (for example, in the driver's area, the middle console, the ceiling console; as a map-reading lamp).

Use of the illumination device (1) as integrated microscope illumination, with the microscope stand being used as a heat sink (40).

Particularly relevant for this intended use as the advantage of the illumination device according to the invention is the fact that it can be designed to be markedly compact. Possible in this way, in particular, are effect illuminations at locations that were not conceivable previously with corresponding effects. Because interior design has meanwhile come to represent a weighty sales argument, in particular for airplanes, the illumination device according to the invention also has considerable advantages in comparison to known illumination devices.

Figure 2:
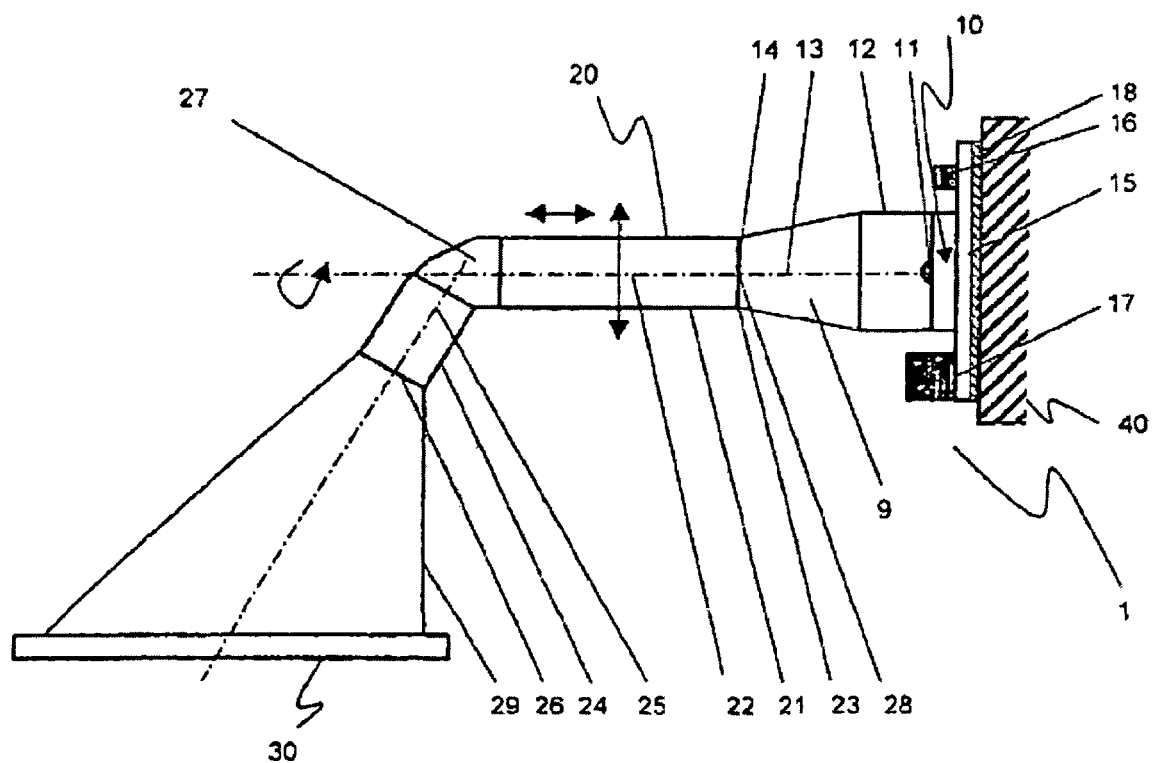
FIG. 2 the side view of the illumination device according to the invention that is shown in FIG. 1.

In a first preferred embodiment according to the invention, which, for reasons of clarity, is illustrated merely schematically in FIGS. 1 and 2, the illumination device includes a light source (10) and a light-guiding element (20) that can be pivoted and/or tilted around a pivoting/tilting point (28) and that has at least one light-guiding axis (22) and at least one light in-coupling surface (23) as well as one light out-coupling surface (26).

The light-guiding axis is understood to mean that axis or direction of the light-guiding element (20) along which the main dispersion direction of the conducted light runs and which, as a rule, corresponds to the axis of symmetry of the light-guiding element (20).

The light-guiding element (20) is arranged, preferably in an axially displaceable manner, such that a free beam area (9) can exist between the light source (10) and the light in-coupling surface (23).

The pivoting/tilting point (28) of the light-guiding element (20), which is mounted in a pivoting/tilting manner, lies at the point of intersection of the light-guiding axis (22) and the light in-coupling surface (23).

Furthermore, in addition to its ability to pivot and tilt, the light-guiding element (20) is mounted so as to rotate around its light-guiding axis (22).

In this preferred embodiment, the pivoting/tilting angle is less than 40°, preferably less than 30°.

In the preferred embodiment of the illumination device described here, the light-guiding element (20), in addition to its ability to pivot and tilt, is mounted so as to be axially displaceable, preferably parallel to its light-guiding axis.

Preferably, in further embodiment, the light-guiding axis (22) of the light-guiding element (20) is arranged coaxially in relation to the beam axis (13) of the light source (10). This means that the lateral offset between the light dispersion direction of the light coming from the light source with essentially the highest light intensity and the light-guiding axis is as small as possible.

The light-guiding element (20) is made preferably of a transparent plastic or of glass, preferably of a high-transparency borosilicate glass, and, particularly preferably, is made of DURAN®.

In an alternative embodiment, the light-guiding element (20) is rigid and is made up of a number of fibers made of a transparent plastic or is made up of glass fibers. In this case, the light-guiding element (20) can be made up of optical fibers that are joined rigidly with one another or else are flexibly held.

In yet another alternative embodiment, the light-guiding element (20) is made up of rigid hollow bodies, which are mirrored on the inside—for example, column-shaped hollow bodies having a round, elliptical, or polygonal cross section.

The light-guiding element (20) can be designed to run either straight or, alternatively, it can be furnished with at least one kinked or bent area (27), with the light-guiding element (20) then including one arm (21) with a light-guiding axis (22) and a light in-coupling surface (23), which is arranged perpendicularly or at an angle to the light-guiding axis (22), as well as another arm (24) with a light-guiding axis (25) and a light out-coupling surface (26), for which the light-guiding axis (22) and the light-guiding axis (25) form an angle that is greater than or equal to 0° and smaller than or equal to 90°.

In another embodiment, the light-guiding element (20) may consist of a combination of flexible optical fibers and rigid elements.

The light out-coupling surface (26) can have a polished or slightly matted design and can have a flat, convex, or concave shape.

The surface of the light in-coupling surface (23) is preferably polished and furnished with an antireflection layer.

In another embodiment, the light-guiding element (20) can have side-emitting characteristics in order to provide an appropriate illumination of the surrounding area in this way.

The light source (10), which is preferably a white-light LED or includes a combination of red, blue, and green LEDs can have a focusing element (12), by means of which the light beams can be focused.

Preferably, the light beams can be focused onto a focus surface (14), which is arranged in the light in-coupling area (23) of the light-guiding element (20) or, in the case when the light in-coupling surface of the light-guiding element has a convex or concave shape, onto a real or virtual focal point defined by the light in-coupling area in relation to the light-guiding axis.

A real or virtual focal point is understood in this case to mean that location from which come light beams that spread further apart essentially parallel to the light-guiding axis of the light-guiding element. Regarded as essentially parallel are deviations from the actual direction of the light-guiding axis of up to 20°, preferably of up to 10°, and most preferably of up to 5°.

Furthermore, a specific adjustment of the color temperature of the light emitted by the illumination device is effected through the spectral course of the absorption of the material of the light-guiding element (20).

Preferably, the white-light LED is arranged on a printed circuit board (15), which has driver electronics (16) for the light-emitting diode (11), which preferably keep the current constant.

In an alternative embodiment, the driver electronics (16) are designed so as to make it possible to dim the white-light LED or the LEDs continuously.

For this purpose, in a further embodiment, the printed circuit board (15) has a switch (17), by means of which the light source (10) can be switched on or off and/or can be dimmed in one or more steps. The switch can be connected to the printed circuit board by means of a lead, a daughterboard, or a receiving socket.

Another preferred embodiment includes a switch (17) that is actuated without contact or free of contact.

In this embodiment, a permanent magnet is fixed in place at the light element or on the frame of the light element (20). The permanent magnet serves for contactless control of the switch (17), which, in this case, is designed, for example, as a Reed contact or Reed relay and can be switched by means of the Hall effect.

In order to enable a contact-free control of the switch, the switch can register optical signals by means of a light-emitting diode, such as, for example, reflected signals or, as an interruption of a light barrier, also the absence of an optical signal.

In an alternative embodiment, the switch (17) can also carry out inductive or capacitive switching operations.

Alternatively to a Reed contact, the switch (17) can also be controlled on the basis of the Hall effect.

In the preferred embodiment, the switch (17) is controlled when the light-guiding element is displaced axially and/or when the light-guiding element (20) undergoes a pivoting/tilting movement and/or when the light-guiding element (20) undergoes a rotational movement around the light-guiding axis of the light-guiding element (20).

Preferably, a reflection element is arranged at the light element (20) or on the frame of the light element in the case of a optically switched contactless switch. The reflection element can be designed as a mirror or as a foil. The construction of a reflection element can also achieved by application of a contrast color.

The illumination device includes a heat sink (40), which is part of at least one housing fastening for the illumination device.

By means of the thermal coupling (18) to the fixed heat sink (40), it is possible to ensure that, for example, LEDs with relatively high light yield can be used. An active cooling of the light source (10) as well as of the driver electronics (16) is therefore not required in this embodiment.

In another preferred embodiment, the light-guiding element (20) of the illumination device (1) assumes an idle position in the switched-off state of the light source (10) and a working position in the switched-on state, which are displaced axially in relation to each other along the beam axis (13) of the light source (10).

The ratio of the surface area of the light in-coupling surface (23) to the surface area of the light out-coupling surface (26) of the light-guiding element (20) is preferably not equal to 1 and, in particular, is to be adapted to the radiation characteristic of the light-guiding element by the numerical aperture of fibers of the light-guiding element (20).

The light out-coupling surface (26) can have a large number of various contours, whereas the light in-coupling surface (23) is has a circular construction.

FIG. 3.*a* shows another embodiment of the illumination device 1 according to the invention in a sectional illustration. The light-guiding element 20, which is not illustrated in the drawing for reasons of illustration, is arranged in a carriage 200. The carriage 200 is itself, in turn, arranged in a ball 300 and arranged in the interior of a housing 400. The ball 300 is itself, in turn, arranged, at least in segments, in the interior of the housing 400 and mounted on the top side of the housing 400 in a sliding manner. The housing 400 is itself, in turn, positioned and, in particular, fixed in place on a printed circuit board 15 or circuit board. The light source 10, which is not illustrated in the present drawing, is mounted on the circuit board 15. An optional lid for fixing the ball in place on the housing is not illustrated in this figure.

Evident, on the one hand, is the wall 401 of the housing 400. In the example shown, the housing 400 has an essentially cylinder-shaped or cylinder-like design. Further illustrated in the drawing is the longitudinal axis 402 of the housing 400. Positioned in the interior of the housing 400 is a lens 12 for focusing the light emerging from the light source 10. The lens 12 is fixed in place on the housing 400. It lies on the axis 402 of the housing 400. In the present case, the lens 12 forms a segment of the free beam area 9 according to the invention. Located in the interior of the housing 400 is, in addition, also the guide surfaces or the guide rail 410.

The guide rails 410 are preferably formed as an integral part of the housing 400. The guide rails 410 are arranged in a lower area essentially parallel to the housing axis 402. In comparison to the mutual separation of the guide rails 410 in the lower area of the housing, the mutual separation of the guide rails 410 in the upper area of the housing 400 is broadened. The lower area is defined by its proximity to the printed circuit board 15. By contrast, the upper area is defined by its proximity to the ball 300 or the ball element 300. The guide surfaces or the guide rails 410 are described once again in detail in one of the following figures.

The ball 300 or the ball element 300 is mounted in the upper area of the housing 400. In detail, the ball 300 is mounted on the upward running guide rails 410. In this case, it is mounted so as to slide and is accordingly initially mounted in a movable manner. The ball element 300 preferably has a two-piece construction, which can be joined by means of screws. Evident are the openings for inserting the screws. In order to keep the ball 300 in a steady and stable position, in particular in composite with the housing 400 and the front ring 500 shown in FIG. 4.a, which will be illustrated below, a spring element 430 is arranged on the side. This is optional. Accordingly, the ball 300 is situated under pretensioning. In order to create the pretensioning for stabilization, the spring force acts at least perpendicularly to the housing axis 402. The spring element 430 is arranged in the present case between the outer wall of the housing 400 and an inner wall or bracket 431. This bracket 431 or tongue 431 lies against the ball 300. This tongue 431 or bracket 431 is, in particular, formed as an integral part of the housing 400.

The carriage 200 is arranged inside of the housing 400 and inside of the ball 300. Illustrated are, on the one hand, the walls 201 of the carriage 200 and, on the other hand, the fins 210 that extend downwards. The walls 201 include both the hatched area and the non-hatched area. The present carriage 200 has, in particular at least, two fins 210. A fin is arranged or fixed in place as a kind of "plate-shaped" appendage in the bottom area on the carriage 200. The fins 210 can be formed as an integral part of the housing 201 of the carriage 200.

The illustrated position of the embodiment according to the invention corresponds to the lowered or retracted position. In this case, the illumination means 10 is, in particular, not active. The two fins 210 are guided or held on their outer side by the inner sides of the guide rails 410. A tilting or a pivoting of the carriage 200, or of the light-guiding element 20 arranged in the carriage 200, is not possible in this position. In addition, a turning around the housing axis 402 is not possible and, if at all, is only possible in a very limited manner. The carriage 200 and the light-guiding element 20 are in their locked, that is, lowered position or placement.

The light-guiding element 20 and/or the carriage 200 are or is arranged in the lowered or locked position essentially parallel to the housing axis 402. The ability of the ball element 300, mounted on and/or in the housing 400, which exists fundamentality because the ball element 300 is joined via the carriage 200 with the housing 400, is also strongly limited or even prevented.

FIG. 3.b shows a position of the illumination device 1 that correspond essentially to the position of the light-guiding element 20 or of the carriage 200 shown in FIG. 3.a. In contrast to FIG. 3.a, the light-guiding element 20 and/or of the carriage 200 is in a more deeply lowered position or placement in comparison to the ball 300 and the housing 400. In the following figures, the spring element 430 is no longer shown. For example, the carriage 200 has been pressed downwards by a user in the direction of the housing axis 402. This corresponds to the first step in the activation of the illumination means 10. The operation of activation or deactivation of the illumination means 10 is illustrated in further detail on the basis of the following figures.

FIG. 3.c corresponds to the embodiment illustrated in FIG. 3.a. However, in the present position, the carriage 200 is in its extended position. The light-guiding element 20 is in its active state. The fins 210, which were locked by the lower area of the guide rails 410 in FIG. 3.a, are now in a released position in relation to the housing 400 on account of the larger diameter in the upper area of the housing 400. A tilting or pivoting of the fins 210 and accordingly also of the carriage 200 and of the light-guiding element 20 is possible in this embodiment. The operation of tilting is illustrated in detail in the following three figures. The fins 210 have now been brought into engagement with a recess 301, which is arranged in the lower area of the ball 300. A tilting and/or pivoting of the carriage 200 or of the light-guiding element 20 now results also in tilting and/or pivoting of the ball 300 as well. The carriage 200 is guided and/or held securely and precisely by resting of the outer surfaces of the carriage 200, on the one hand, against the inner side of the ball 300 in the upper area of the ball 300 and, on the other hand, via the fins 210 on the inner side of the ball 300 in the lower area.

FIG. 3.d shows a position of the light-guiding element 20 or of the carriage 200, which corresponds essentially to the position illustrated in FIG. 3.c. In distinction to FIG. 3.c, the light-guiding element 20, and accordingly also the ball 300 and the carriage 200, is tipped toward the housing axis 402. By way of example, the light-guiding element 20 is tipped toward the housing axis 402 by an angle of about 8° degrees. The pivoting and/or tilting possibility of the illumination device according to the invention makes it possible to illuminate specifically different areas. A further difference is that the carriage 200 is somewhat more deeply lowered than in FIG. 3.c. However, the lowering is illustrated only by way of example and is not necessarily required for a tilting of the light-guiding element 20.

It can be seen that the fin 210 illustrated on the right in the figure comes to rest against the guide rail 410, in particular in the middle area of the guide rail 410. The fin 210 illustrated on the left in the figure is initially in a free position in the interior of the housing 400. The resting of the one fin, which, in this case, is the right fin 210, against the guide rail 410 results, on the one hand, in a defined guiding, particularly controlling, of the tilting and/or pivoting. In addition, the formation of the guide rail 410 also results in a limitation of the maximum tilting and/or pivoting angle of the carriage 200 and/or of the light-guiding element 20. Because the light-guiding element 20 and/or the carriage 200 are or is held in the ball 300 and are or is guided, the ball 300 also pivots together with the carriage 200. The carriage 200 may also be referred to as a guide carriage 200.

The position of the carriage 200 and/or of the light-guiding element 20 illustrated in FIG. 3.e corresponds essentially to the position illustrated in FIG. 3.d. In distinction to FIG. 3.d, the light-guiding element 20 is tilted by a larger angle with respect to the housing axis 402.

In the present case, the carriage 200 and/or the light-guiding element 20 is tilted by an angle of about 12° degrees with respect to the housing axis 402 by way of example. Owing to the increasing tilting, the fin 210 illustrated on the right in the figure is in a higher position in comparison to the fin 210 illustrated in FIG. 3.d. The fin 210 illustrated on the right in FIGS. 3.d and 3.e is in its respective active position. The term active position is understood to mean that the fin 210 is in contact with the guide rail 410. The fins 210 may also be referred to as guide fins 210.

The position of the light-guiding element 20 illustrated in FIG. 3.f corresponds essentially to the position that has already been illustrated in FIG. 3.e. In distinction to FIG. 3.e, the light-guiding element 20 and/or the carriage 200 is in an even further tilted position or placement. In the present case, the tilting angle is about 20° degrees with respect to the housing axis 402. The fin illustrated on the right in the figure is in its free position. The term free position is understood to mean that the fin 210 can still be in contact with the guide rail 410, but that the fin 210 can also be rotated over a larger range in this area, namely in a plane that lies at a right angle to the housing axis 410. In this position, the light-guiding element 20 can rotate freely within certain limits, preferably around the housing axis 402 and can freely tilt and/or pivot around a pivoting/tilting point 28. The guide rails 410 form a control cam or a reset cam for the movement of the carriage 200 and/or of the light-guiding element 200 and particularly also of the ball 300, because the carriage is arranged inside of the ball 300. The light-guiding element 20 can accordingly be moved in a defined way within certain limits.

FIG. 4.a shows the illumination device 1 in another sectional illustration. In the present case, the light-guiding element 20 and the front ring 500 are now also illustrated. The front ring 500 or the holding device 500 serves to position or to fix in place the ball 300 on the housing 400. The front ring 500 serves as support surface for the projections 310 shown in FIG. 6.a. In the present case, the light-guiding element 20 is fixed in place in the interior of the carriage 200 by two holding devices 202, 203. For the sake of simplicity, the illustration of the illumination means 10 and the lens 12 is dispensed with. The light impinges from below onto the light in-coupling surface 23 of the light element 20. The light is then guided along the light-guiding axis 22 through the light-guiding element 20. In its upper area, the light-guiding element 20 has a bent area 27. The light is, so to speak, led around the corner. It then emerges from the light guide via the light out-coupling surface 26. Accordingly, in the present embodiment, the light emerges out of illumination device 1 from the side. The illuminated area can be changed in a defined manner by rotating the carriage 200 around the housing axis 402 and/or a tilting the carriage 200 around its pivoting/tilting point 28. In the upper area of the carriage 200, furthermore, there is a symbol button 204 in the form, for example, of a translucent window 204. Accordingly, it can be seen through this window 204 whether the illumination device 1 is in an active or inactive state. However, the symbol button 204 can also be designed to be opaque, that is, nontranslucent. The symbol button 204 can be imprinted with a symbol such as, for example, a lamp symbol or has an appropriate text/imprint on its surface.

To be seen, in addition, in the drawing is the damping device 320 according to the invention, which guides the movement of the carriage 200 in the ball 300 in a damping manner and/or in a specific, particularly supporting, manner. In the present case, the damping element 320 is designed as a kind of toothed wheel 320. The damping element 320 interacts with a patterned structure 330, which is arranged or introduced on or in the inner side of the ball 300. The structured pattern 330 in the inner side of the ball 300 can be designed as a kind of tooth series that engages in the teeth of the toothed wheel. Owing to the damping element 330, there is no "jerked" retraction and extension of the carriage 200, but rather the carriage 200 can slide in a defined manner.

Further to be seen are also the stop surfaces 360 and 420 or stops 360 and 420. The stop 360 is arranged in the inner side of the ball 300. The stop 420 is arranged in the interior of the housing 400. The function thereof will be discussed below in connection with FIG. 7.

The position of the light-guiding element 20 and/or of the carriage 200 shown in FIG. 4.b corresponds essentially to that illustrated in FIG. 4.a. However, in the present case, the sectional illustration is changed by an angle of 90° degrees. Also to be seen in this embodiment is the patterned structure 330 in the inner side of the ball 300. Further illustrated is also the toothed wheel 320 in the housing 400 or in the ball 300. The fins 210 for guiding the carriage 200 in the housing 400 are not shown in the present illustration. Also illustrated on the right side of the carriage 200 in the figure, however, is a projection 220, which is arranged at the bottom side of the carriage 200 and extends downwards. This projection 220 is preferably formed as an integral part together with the housing 201 of the carriage 200. This projection 220 may also be referred to or regarded as a fin 210, since the projection 220 can, preferably in a supporting manner, assist during guiding of the carriage 200 in the housing 400. A key function of this projection 220, however, is to trigger the switching operation for activation and/or deactivation of the illumination means 10. In the present case, the light-guiding element 20 or the device 1 is in its active position. The switch 17 is positioned on the housing in the right side of the figure. Preferably, the switching element 17 is fixed in place in a receiving pocket, which is not illustrated. Owing to the fact that the projection 220 is in its upper position or in an upper position, the switch 17, which is also referred to as a switching element 17, is in a released position. The light source 10 is activated. The switching electronics or the wiring is not illustrated in the present case. If the switching element 17, as discussed above, is designed as a mechanical switch 17, this switching operation works via a contact of the projection 220 with the switching element 17. In another embodiment, however, the switching operation can be triggered without contact. In such a case, the proximity of the projection 220 to the position of the switching element 17 is sufficient. This proximity is achieved by way of a insertion or lowering of the carriage 200. Regardless of the embodiment of the switch 17, the switch is displaced so far back and down that a switching operation is triggered only when the lateral movement of the light-guiding element 20 or of the carriage 200 has been concluded. As a result, it is possible effectively to prevent damage to the switch 17 due, for example, to a carriage that is still at an angle.

FIG. 5 shows a detailed view, in perspective, of the inner area of the housing 400 in plan view. The housing 400 is shown, without the ball 300 and the carriage 200 being introduced into it. To be seen, in addition, is the spring element 430 for pretensioned holding of the ball 300. In the present case, the bracket 431 is formed by the bottom of the guide rail 410. In particular, the guide rail 410 according to the invention is illustrated in detail. In its lower area, the guide rail 410 is designed as a kind of groove. This groove forms the second, preferably lower area or segment 412 of the guide rail 410. The inner surfaces 416 or guide surfaces 416 are not essentially beveled here. They form the sides of an essentially right-angled parallelepiped. A first segment 411 adjoins the upper area of the second segment 412. This segment 411 is broadened in diameter in comparison with the second segment 412. The inner surfaces 415 or guide surfaces 415 of the guide rail 410 are, in addition, beveled in this first segment 411. The diameter increases, preferably steadily, from below to above. The broadened diameter of the guide rail 410 in the first, that is, upper, segment 411 and the creation of guide surfaces 415, 416, and 417 provide for a simplified threading or insertion of the fins 210 when the light-guiding element 20 is lowered or inserted into the housing 400. In a manner that is defined in this way, the fin 210 is guided from a free position into the locked position. The locked position of the fin 210 and accordingly also the locked position of the light-guiding element 20 is defined by the second, that is, lower, segment 412 of the guide rail 410. In the locked position, the fin 210, which is also referred to as guide fin 210, and accordingly also the light-guiding element 20 can essentially no longer be rotated.

A possible limited ability to rotate can be caused by a reduced thickness of the fin 210 in comparison with the diameter of the guide rail 410 in the lower area 412. In addition, the broadening in the upper segment 411 of the guide rail 410 provides for an ability to rotate or a turning freedom of the fin 210 and accordingly also of the light-guiding element 20.

The guide surfaces 415 and 416 enable, on the one hand, the rotational movement of the light-guiding element 20 or of the carriage 200, in particular without the fins 210 getting jammed or stuck in any way. In addition, the guide surfaces 415 "trap" the rotational movement and/or the pivoting movement of the fins 210 and accordingly also of the light-guiding element 20. They guide the light-guiding element 20, in particular from any arbitrary position, back into the retracted position. The guide surfaces 417 serve to guide the pivoting movement of the light-guiding element 20, in particular without the fins 210 getting jammed or stuck in any way. The guide surfaces 417 "trap" the pivoting movement of the fins 210 and accordingly also of the light-guiding element 20. They guide the light-guiding element 20, in particular from any arbitrary position, back into the retracted position.

In an extended position of the light-guiding element 20, any desired spatial illumination is possible, within defined limits, through the possibility of a pivoting movement and a rotational movement of the light-guiding element 20. The design of the guide rail 410 and of the fins 210 and their interaction makes possible a return of the light-guiding element 20 from any arbitrary position into the retracted position. In this case, the retracted position may be referred to as the null position. It is, so to speak, a three-dimensional return, which can be produced also by a pivoting and rotational movement.

A further segment 413 adjoins at the upper area of the first segment 411. This is the so-called third segment 413. It is involved, for one thing, in the insertion operation of the fins 210. However, the key function of this third segment 413 is the mounting of the ball 300. This third segment 413 accordingly represents a support surface for the ball 300.

In the present case, the guide rail 410 is formed in all three segments 411, 412, and 413 as a kind of rib-shaped ridge. The third segment 413 has a further surface on the sides that face away from the guide surfaces. This is the so-called support surface 414. It may be beveled. By way of this surface 414 or by way of this raised portion, the ability to rotate or the rotational freedom of the ball element 300 and accordingly also the ability to rotate or the rotational freedom of the light-guiding element 20 is alternatively or supplementally limited. This is achieved by distributing raised portions 310 or projections 310 over the outer circumference of the ball 300, at least in segments. During rotation, these come to rest against the stop surface 414 and accordingly limit the ability of the ball 400 to rotate and accordingly also that of the light-guiding element 20.

The mentioned projections 310 are illustrated in detail in FIG. 6.a. FIG. 6.a shows an external view of the ball element 300 and of the carriage 200 contained in it. The light-guiding element 20 and/or the carriage 200 are or is situated in FIG. 6.a in their extended, that is, upper, position. The projections 310 are preferably spaced evenly around the circumference on the outer side of the ball element 310. The distribution of the projections 310 is, in particular, adapted to the arrangement of the support surfaces 414 or the distribution of the guide rails 410. When the ball element 300 is turned in relation to the housing 400, these projections 310 come to rest against the ribs mentioned above in regard to FIG. 5, which form the guide rails 410. When the light-guiding element 20 is pivoted, the projections 310 come to rest against the front ring 500 shown in FIG. 4.a. Accordingly, they can also define the maximum pivoting angle of the light-guiding element. As a result, during pivoting, a tensioning of the fin 210 shown in FIG. 3.f, by way of example, is prevented as well. To be seen in the lower area of the carriage 200 is the projection 220, which triggers the switching operation at the switching element 17. Furthermore, a recess 340 is introduced in the circumference of the ball 300. This recess 340 serves for preferably holding the catch element, which is not illustrated here, in a movable manner. The catch element will be discussed below further in regard to FIGS. 6.b and 7.

Figure 7:
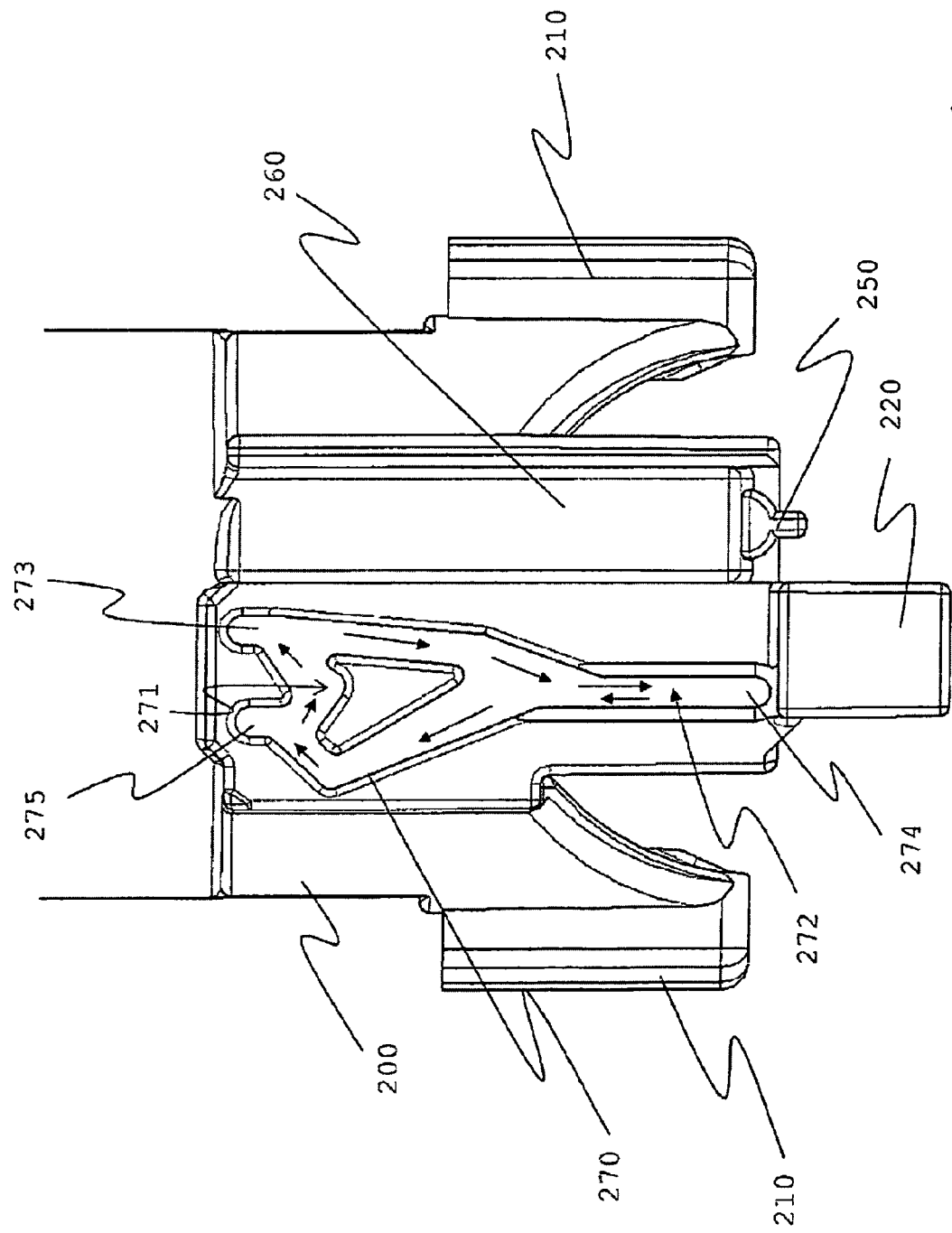
FIG. 7 the heart cam according to the invention.

FIG. 6.b shows an inner view of one side of the ball element 300 according to the invention. To be seen, in turn, is the recess 340, which, in the present case, is designed as an opening, in the outer side of the ball element 300. Fastened in a movable manner in this recess 340 is the catch element, which is not illustrated in the present case. To be mentioned as further key feature is the projection 350 in the inner side of the ball 300. This projection 350 is, so to speak, positioned next to the recess 340. The spring element, which is not illustrated here, for pretensioning the carriage 200 against the ball element 300 is fastened at this projection. In order to better illustrate the interaction, FIG. 6.b and FIG. 7 will be discussed jointly. FIG. 7 shows an external view of the lower area of an outer side of the carriage 200. To be seen are, on the one hand, the outer side of the two fins 210. Further illustrated in the lower area is the projection 220 for activation of the switching operation of the illumination means 10. The projection 220 may also be referred to as an actuator for the switching operation.

To be seen, in addition, is a projection 250, which is laterally offset in relation to the actuator 220 and which preferably essentially corresponds to the projection 350 shown in FIG. 6.b. The projection 250 serves as well for fixing in place the spring element and is arranged in a kind of recessed portion or channel 260. The channel 260 serves for guiding the spring, so that any contact of the spring with the carriage is prevented. Laterally offset in relation to the projection 250 or in relation to the channel 260 is a groove or recessed portion 270. This groove 270 represents the control cam 270. In the present case, the control cam 270 is designed as a heart cam 270. The catch element, preferably designed as a kind of hook, is held at one end by the recess 340 in the ball 300 and engages at the other end in the control cam 270. In this case, the catch element is mounted so as to move in a sliding manner in the control cam 270. Via this control cam 270, the switching and/or the movement of the carriage 200, in particular of the light-guiding element 20, is controlled.

A spring, preferably a spiral spring, is held by the two projections 250 and 350. As a result, the ball 300 and the carriage 200 are pretensioned against each other. The carriage 200 is moved downwards by a force from the outside, preferably from above, imposed by a person using or employing it, for example. As a result, the spring is further tensioned. The restoring forces increase. The catch element is guided in the control cam 270 in accordance with the deflection.

In this case, the heart cam 270 takes up two positions, a first, preferably upper, catch point 271, and a second, preferably lower, catch point 272, in which the catch element catches or holds. In the upper catch point 271, the light-guiding element 20 is in its retracted, preferably deactivated placement or position. In this case, the system is pretensioned by the spring. In the lower catch point 272, the light-guiding element 20 is in its extended, preferably activated placement or position. The drawn arrows show the course that the catch element takes in the heart cam 270. This first catch position 271 corresponds to the position shown in FIG. 3.a.

The light-guiding element 20 is now pressed slightly downwards. As a result, the catch element is released and moves toward the top right in the illustrated control cam 270. The light-guiding element 20 is lowered more deeply in the housing 400 and the ball 300. This position corresponds to the position illustrated in FIG. 3b. The heart cam is extended in this upper area 273, shown on the right in the figure. Introduced in this upper heart area is a groove 273, which is arranged preferably parallel to the housing axis 402. Accordingly, the catch element does not come to rest against the upper inner wall of the heart cam 270, even for maximum penetration depth of the light-guiding element 20. In this case, the penetration depth is not defined by the stop of the catch element at the inner upper wall of the heart cam 270. The maximum penetration depth is defined by the mechanical stop 420 shown in FIG. 4.a. The fin 210, in particular, comes to rest against the latter. As a result, the catch element cannot be brought to rest against the upper right edge of the heart cam 270 and pressed out of it or even destroyed, even in the case of improper handling, such as, for example, when the light-guiding element 20 is pressed in excessively. In both cases, this would lead to a malfunction or even destruction of the illumination device.

When the above-acting force is taken away, that is, by release of the light-guiding element 20, the carriage 200 is pulled upwards by the spring force. The catch element moves from top to bottom in the channel illustrated on the right. However, it does not come to rest against the lower edge of the heart cam 270. Instead, the heart cam 270 is extended at its tip by another groove 274, which is arranged preferably parallel to the housing axis 402. In this case, the projecting of the light-guiding element 20 or its maximum outer position is not defined by the stop of the catch element at the tip of the heart cam 270. The maximum outer position is defined by the mechanical stop 360 shown in FIG. 4.a. The latter comes to rest against a stop arranged on the outer side of the carriage 200. As a result, the catch element cannot be brought to rest against the lower edge of the heart cam 270 and pressed out of it or even destroyed, even in the case of improper handling by, for example, pulling too roughly on the light-guiding element 20. The catch element is held by the spring force at the point 272, that is, without support against the lower inner wall of the heart cam 270 or the heart tip. The spring force presses the carriage 200 against the stop 360 in the ball element 300. This lower point corresponds to the second catch point 272. The light-guiding element 20 and/or the carriage 200 are or is in the extended, that is, active, position in this catch point. This corresponds to the position illustrated in FIG. 3d.

If the light-guiding element 20 is again deactivated, then a force is to be exerted from above onto the light-guiding element 20 and/or the carriage 200. As a result, the catch element is guided again upwards against the spring force or the carriage 200 is guided downwards, so that the catch element moves upwards in relation to the carriage 200 or the heart cam 270. On account of the asymmetrical shape of the heart cam 270, the catch element now takes the path shown in the left in the heart cam 270 and passes a corner, but it does not come to rest in the left upper arch of the heart. The force that acts from the outside is always still present. The heart cam is also extended in this upper area, shown on the left in the figure. Introduced in this upper heart area is a groove 275, which is arranged preferably parallel to the housing axis 402. Accordingly, the catch element does not come to rest against the upper inner wall of the heart cam 270, even at maximum penetration depth of the light-guiding element 20. In this case, the penetration depth is, in turn, not defined by the stop of the catch element at the inner upper wall of the heart cam 270. The maximum penetration depth is defined, in turn, by the mechanical stop 420 shown in FIG. 4.a. As a result, the catch element cannot come to rest at the upper left edge of the heart cam 270 and be pressed out of it or even destroyed, even in the case of improper handling, in particular during deactivation.

When the force is taken away, the carriage 200 is pulled upwards again by the spring force. The catch element meets the central raised portion of the heart and is guided back into the first catch position 271. The system is again in the starting point, already described above. The system is switched off in this state, since the actuator 220 is situated in the proximity of the switching element 17 and triggers a switching operation. The cycle can be repeated by renewed pressing of the light-guiding element 20 from top to bottom.

A securing or a destruction protection against inappropriate handing of the illumination device 1 is ensured by the upper extensions 273 and 274 or grooves 273 and 275 and the lower extension 274 or groove 274 of the heart cam 270. In particular, a malfunction of the catch element by excessive pressing of the light-guiding element 20 or pulling on the light-guiding element 20 is not possible. The catch element assumes essentially only the function of guiding from one catch position 271 into the other 272 and vice versa. However, it does form the stop for the movement or for the catch points 271 and 272. In this case, the illumination device 1 can have a misuse safety margin of up to 400 N.

The illumination described above may be used advantageously as a seat illumination and/or reading light for airplane seats and/or for seats in rail vehicles and/or in motor vehicles, which are integrated into ceilings, walls, or in the seats.

Also the use as work lamp, which can be integrated into ceilings or walls, offers key advantages on account of the compact design. The same holds true for the use as illumination device in furniture, in particular in kitchen furniture, or else as object illumination in showcases.

The illumination device can be integrated or installed in the ceilings, in the wall, or in the seat in such a way, in each case, that it is retracted, at least in segments. The illumination device, its extended position, projects out of the ceiling, the wall, or the seat.

Further advantageous is also the use of the illumination device as aperture-free, if appropriate retractable, instrument illumination in passenger cars, in particular also as effect illumination for, above all, airplanes.

Use of the illumination device according to at least one of the preceding claims as integrated microscope illumination.

The illumination device according to the invention has, in particular, the advantage that it has a compact design, but nonetheless makes possible efficient light via a light-guiding element that can be pivoted and/or tilted and can, in addition, be displaced in the direction of the light source so as to be directed to the location that is to be illuminated.

The pivoting/tilting mounting of the light-guiding element (20) allows a high degree of flexibility to be achieved in regard to the illumination of objects. Overall, this arrangement makes possible a particularly compact design, which enables, in particular, a space-saving installation.

Because the at least one light-emitting diode is fixed in place on a printed circuit board, which is preferably firmly joined by means of a thermal coupling with a fixed heat sink, a cooling device that requires active power can be dispensed with, even at high illuminance.

It is obvious to the skilled practitioner that the embodiments described above are to be understood as being exemplary. The invention is not limited to them, but rather can be varied in diverse ways without departing from the spirit of the invention. The individually illustrated features can be combined with one another as well.

LIST OF REFERENCE NUMERALS

1 Illumination device
9 free beam area
10 light source or illumination means
11 light-emitting diode
12 focusing element or lens
13 beam axis
14 focus surface
15 printed circuit board or circuit board
16 driver electronics
17 switch or switching element
18 mechanical fastening and/or thermal coupling
20 light-guiding element
21 arm 1
22 light-guiding axis
23 light in-coupling surface
24 arm 2
25 light-guiding axis
26 light out-coupling surface
27 bent area
28 pivoting/tilting point
29 cone of illumination
30 object
40 heat sink
200 carriage or guide carriage
201 wall of the carriage
202 holding device of the light-guiding element
203 holding device of the light-guiding element
204 window or opaque window or symbol button or symbol plate
210 fin
220 actuator or actuator surface for switching
250 projection or pin for fastening the spring
260 channel for spring
270 control cam or heart cam
271 first catch position or locking position or locking in the "off" position
272 second catch position or locking position or outer position or stop of the carriage in the ball
273 upper extension or upper groove at the upper area of the heart curve 270
274 upper extension or upper groove at the upper area of the heart curve 270
275 lower extension or lower groove at the heart tip of the heart curve 270
300 ball or ball element or bearing element
310 projection or stop on the outer side of the ball
320 damping element or device
330 patterned structure or toothing for damping element
340 fastening of the catch detent in the ball wall
350 projection or pin for fastening the spring
360 stop or stop surface in the ball
400 housing
401 wall of the housing
402 axis or longitudinal axis of the housing
410 guide rail or guide funnel
411 upper area of the guide rail or of the guide funnel
412 lower area of the guide rail or of the guide funnel or guide groove
413 support surface for the ball element
414 stop surface for the projection 310
415 guide surface for the guide funnel
416 guide surface for the guide funnel
417 guide surface for the guide funnel
420 stop or stop surface in the housing
430 spring element for positioning of the ball
431 bracket for support at the ball
500 front ring or fastening means for the ball

The invention claimed is:

1. An illumination device, comprising:
a light source; and
a light-guiding element, the light-guiding element including light-guiding fibers or a light guiding rod, the light-guiding element being configured to be pivoted and/or tilted around a pivoting/tilting point, the light-guiding element having at least one light-guiding axis, at least one light in-coupling surface, and at least one light out-coupling surface, the light-guiding element being arranged so as to be axially displaceable in such a way that a free beam area can exist between the light source and the at least one light in-coupling surface.

2. The illumination device according to claim 1, wherein the pivoting/tilting point lies at a point of intersection of the at least one light-guiding axis and the at least one light in-coupling surface.

3. The illumination device according to claim 1, wherein the light-guiding element is mounted so as to be able to rotate around the at least one light-guiding axis.

4. The illumination device according to claim 1, wherein the pivoting/tilting angle between a beam axis and the light source is less than 40°.

5. The illumination device according to claim 1, wherein the light-guiding element is mounted so as to be axially displaceable with respect to the light source.

6. The illumination device according to claim 5, wherein the at least one light-guiding axis of the light-guiding element is arranged coaxially in relation to a beam axis of the light source.

7. The illumination device according to claim 1, wherein the light-guiding element is straight.

8. The illumination device according to claim 1, wherein the light-guiding element has at least one bent area, which is designed in such a way that the light-guiding element includes one arm with a first light-guiding axis and the light in-coupling surface, which is arranged at a right angle to the first light-guiding axis, as well as another arm with a second light-guiding axis and the light out-coupling surface, with the first light-guiding axis and the second light-guiding axis forming an angle that is greater than or equal to 0° and smaller than or equal to 90°.

9. The illumination device according to claim 1, wherein the light source has a focusing element that focuses a light beam onto the at least one light in-coupling surface of the light-guiding element.

10. The illumination device according to claim 1, further comprising a switch to activate and deactivate the light source.

11. The illumination device according to claim 10, wherein the switch can be switched without contact.

12. The illumination device according to claim 1, wherein the light-guiding element has an idle position in a deactivated state of the light source and a working position in an activated state, the working position being displaced along a beam axis of the light source.

13. The illumination device according to claim 1, further comprising a displaceable carriage holding and axially guiding the light-guiding element.

14. The illumination device according to claim 13, further comprising a ball for mounting the displaceable carriage.

15. The illumination device according to claim 14, further comprising a housing receiving the ball and the displaceable carriage.

16. The illumination device according to claim 15, wherein the displaceable carriage has, at least in segments, the shape of a pin, at a bottom end of which is arranged at least one fin guiding the displaceable carriage in the ball and/or in the housing.

17. The illumination device according to claim 15, wherein the light guide and/or the displaceable carriage are or is arranged so as to be axially displaceable in the ball and/or movable in the housing.

18. The illumination device according to claim 14, wherein the light guide and/or the displaceable carriage extend or extends through the ball.

19. The illumination device according to claim 15, wherein the ball is mounted so as to move in a sliding manner, on and/or in the housing.

20. The illumination device according to claim 13, wherein the light-guiding element and/or the displaceable carriage is moved against the pressure of a spring.

21. The illumination device according to claim 16, wherein movement of the at least one fin is controlled by at least one guide surface arranged in an interior of the housing.

22. The illumination device according to claim 1, wherein the light source is configured for a use selected from the group consisting of seat illumination, a reading light for an airplane seat, a reading light for a rail vehicle seat, a reading light for a motor vehicle seat, a working lamp, a working lamp integrated into a ceiling, a working lamp integrated into a wall, furniture, kitchen furniture, an illumination showcase, an aperture-free lamp, instrument illumination in passenger cars, an integrated microscope, an illumination element in a motor vehicle, and an effect illumination element for an airplane.

23. An illumination device, comprising:
a light source;
a light-guiding element that can be pivoted and/or tilted around a pivoting/tilting point, the light-guiding element having at least one light-guiding axis, at least one light in-coupling surface, and at least one light out-coupling surface, the light-guiding element being arranged so as to be axially displaceable in such a way that a free beam area can exist between the light source and the at least one light in-coupling surface;
a displaceable carriage holding and axially guiding the light-guiding element;
a ball for mounting the displaceable carriage; and
a housing receiving the ball and the displaceable carriage, wherein the displaceable carriage has, at least in segments, the shape of a pin, at a bottom end of which is arranged at least one fin guiding the displaceable carriage in the ball and/or in the housing.

24. The illumination device according to claim 23, wherein movement of the at least one fin is controlled by at least one guide surface arranged in an interior of the housing.

25. An illumination device, comprising:
a light source;
a light-guiding element, the light-guiding element including light-guiding fibers or a light guiding rod, the light-guiding element being configured to be pivoted and/or tilted around a pivoting/tilting point, the light-guiding element having at least one light-guiding axis, at least one light in-coupling surface, and at least one light out-coupling surface, the light-guiding element being arranged so as to be axially displaceable in such a way that a free beam area can exist between the light source and the at least one light in-coupling surface;
a displaceable carriage holding and axially guiding the light-guiding element; and
a ball for mounting the displaceable carriage.

26. The illumination device according to claim 25, further comprising a housing receiving the ball and the displaceable carriage.

27. The illumination device according to claim 26, wherein the light guide and/or the displaceable carriage are or is arranged so as to be axially displaceable in the ball and/or movable in the housing.

28. The illumination device according to claim 25, wherein the light guide and/or the displaceable carriage extend or extends through the ball.

29. The illumination device according to claim 26, wherein the ball is mounted so as to move in a sliding manner, on and/or in the housing.

* * * * *